United States Patent
Keller et al.

(10) Patent No.: US 12,319,866 B2
(45) Date of Patent: Jun. 3, 2025

(54) ALKALINE EARTH METAL MINERALS AS CARRIERS FOR SURFACTANTS IN DRILLING FLUIDS

(71) Applicant: Omya International AG, Oftringen (CH)

(72) Inventors: Tobias Keller, Gränichen (CH); Samuel Rentsch, Spiegel bei Bern (CH); Jarrod Massam, Katy, TX (US)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 18/004,777

(22) PCT Filed: Jul. 15, 2021

(86) PCT No.: PCT/EP2021/069713
§ 371 (c)(1),
(2) Date: Jan. 9, 2023

(87) PCT Pub. No.: WO2022/013339
PCT Pub. Date: Jan. 20, 2022

(65) Prior Publication Data
US 2023/0303905 A1  Sep. 28, 2023

(30) Foreign Application Priority Data
Jul. 16, 2020 (EP) .................... 20186201

(51) Int. Cl.
*C09K 8/16* (2006.01)
*B82Y 30/00* (2011.01)

(52) U.S. Cl.
CPC .............. *C09K 8/16* (2013.01); *B82Y 30/00* (2013.01); *C09K 2208/10* (2013.01)

(58) Field of Classification Search
CPC .......... C09K 8/03; C09K 8/032; C09K 8/035; C09K 8/04; C09K 8/05; C09K 8/06; C09K 8/08; C09K 8/10; C09K 8/12; C09K 8/14; C09K 8/145; C09K 8/16; C09K 8/18; C09K 8/20; C09K 8/203; C09K 8/206; C09K 8/22; C09K 8/24; C09K 8/26; C09K 8/265; C09K 8/28; C09K 8/32; C09K 8/34; C09K 8/36; C09K 2208/00; C09K 2208/10; E21B 21/00; E21B 21/001; E21B 21/003; E21B 21/14; E21B 21/16
See application file for complete search history.

(56) References Cited

U.S. PATENT DOCUMENTS

| 1,361,324 | A |   | 12/1920 | Grunwald |  |
|---|---|---|---|---|---|
| 2,729,426 | A | * | 1/1956 | Smith | C09K 8/38 |
|  |  |  |  |  | 507/901 |
| 3,689,410 | A | * | 9/1972 | Darley et al. | C09K 8/36 |
|  |  |  |  |  | 507/116 |
| 3,897,519 | A |   | 7/1975 | Hogberg et al. |  |
| 4,126,650 | A |   | 11/1978 | Via et al. |  |
| 4,350,645 | A |   | 9/1982 | Kurosaki et al. |  |
| 4,921,990 | A |   | 5/1990 | Uphues et al. |  |
| 5,554,781 | A |   | 9/1996 | Reirson |  |
| 5,979,461 | A |   | 11/1999 | Bensalem et al. |  |
| 6,209,646 | B1 | * | 4/2001 | Reddy | C09K 8/46 |
|  |  |  |  |  | 166/293 |
| 6,710,199 | B2 |   | 3/2004 | Tsuyutani et al. |  |
| 9,354,180 | B2 |   | 5/2016 | Jiang et al. |  |
| 10,961,444 | B1 | * | 3/2021 | Bestaoui-Spurr | C09K 8/528 |
| 2003/0078180 | A1 |   | 4/2003 | Munoz, Jr. | C11D 3/43 |
|  |  |  |  |  | 510/424 |
| 2004/0020410 | A1 |   | 2/2004 | Gane et al. |  |
| 2012/0252706 | A1 |   | 10/2012 | Steiner |  |
| 2012/0273197 | A1 | * | 11/2012 | Gupta | C09K 8/80 |
|  |  |  |  |  | 166/305.1 |
| 2015/0344767 | A1 | * | 12/2015 | Lei | C08L 29/04 |
|  |  |  |  |  | 507/224 |
| 2018/0010038 | A1 | * | 1/2018 | Greenhill-Hooper | |
|  |  |  |  |  | C09K 8/703 |
| 2018/0051200 | A1 |   | 2/2018 | Clapper |  |
| 2020/0056088 | A1 |   | 2/2020 | Veldman |  |

FOREIGN PATENT DOCUMENTS

| CA | 2601900 | A1 | * | 3/2008 | .......... C04B 20/008 |
|---|---|---|---|---|---|
| EP | 1092000 | B1 |   | 9/2004 |  |
| EP | 1712523 | A1 |   | 10/2006 |  |
| EP | 1712597 | A1 |   | 10/2006 |  |
| EP | 2264109 | A1 | * | 12/2010 | .......... C01B 32/942 |
| EP | 2371766 | A1 |   | 10/2011 |  |
| EP | 2447213 | A1 |   | 5/2012 |  |
| EP | 2524898 | A1 |   | 11/2012 |  |
| EP | 2770017 | A1 |   | 8/2014 |  |
| EP | 3192837 | A1 |   | 7/2017 |  |
| EP | 3517502 | A1 |   | 7/2019 |  |
| ES | 2809123 | T3 | * | 3/2021 | .......... B01F 3/04446 |
| GB | 544907 |  |   | 5/1942 |  |
| GB | 548197 |  |   | 9/1942 |  |

(Continued)

OTHER PUBLICATIONS

Translation of ES-2809123-T3 (Year: 2021).*
International Search Report and Written Opinion issued in PCT/EP2021/069713 mailed Oct. 15, 2021.
Gane et al., "Void Space Structure of Compressible Polymer Spheres and Consolidated Calcium Carbonate Paper-Coating Formulations", Industrial & Engineering Chemistry Research, vol. 35, No. 5, 1996, pp. 1753-1765.
Herbert M. Collins, et al., Pesticide Formulations and Application Systems: 17th vol. STP1268; Published: 1996.

*Primary Examiner* — Angela M DiTrani Leff
(74) *Attorney, Agent, or Firm* — Heslin Rothenberg Farley & Mesiti P.C.

(57) ABSTRACT

A drilling fluid comprising an alkaline earth metal mineral carrier, a process for producing a drilling fluid and the use of a loaded mineral carrier for the delivery of a surfactant to a drilling fluid.

16 Claims, No Drawings

(56) References Cited

FOREIGN PATENT DOCUMENTS

| | | | |
|---|---|---|---|
| GB | 2448442 A * | 10/2008 | ............. C09K 8/516 |
| WO | 0039222 A1 | 7/2000 | |
| WO | 2004083316 A1 | 9/2004 | |
| WO | 2005121257 A2 | 12/2005 | |
| WO | 2008023076 A1 | 2/2008 | |
| WO | 2009074492 A1 | 6/2009 | |
| WO | 2011054831 A1 | 5/2011 | |
| WO | 2011147802 A1 | 12/2011 | |
| WO | 2013142473 A1 | 9/2013 | |
| WO | 2014060286 A1 | 4/2014 | |
| WO | 2014128087 A1 | 8/2014 | |
| WO | 2016023937 A1 | 2/2016 | |
| WO | 2016087286 A1 | 6/2016 | |
| WO | 2018034909 A1 | 2/2018 | |
| WO | WO-2018101929 A1 * | 6/2018 | ............... C09K 8/36 |

\* cited by examiner

ALKALINE EARTH METAL MINERALS AS CARRIERS FOR SURFACTANTS IN DRILLING FLUIDS

CROSS REFERENCE TO RELATED APPLICATIONS

This application is a U.S. National Phase filing under 35 U.S.C. § 371 of International Application PCT/EP2021/069713, filed Jul. 15, 2021, and published as WO 2022/013339 A1 on Jan. 20, 2022. PCT/EP2021/069713 claims priority from European patent application number 20186201.8, filed Jul. 16, 2020. The entire contents of each of these prior applications are hereby incorporated herein by reference.

The present invention relates to a drilling fluid comprising an alkaline earth metal mineral carrier, to a process for producing a drilling fluid and to the use of a loaded mineral carrier for the delivery of a surfactant to a drilling fluid.

Drilling fluids, also named drilling muds, are engineered compositions, which are indispensable for drilling boreholes. They can be classified into water-based, oil-based, synthetic based, oil-in-water and water-in-oil (also called inverse emulsion) drilling fluids. Their primary functions are building hydrostatic pressure within the borehole to prevent or restrict formation fluids from entering into the borehole, cooling, lubricating and cleaning the drill bit and removing drill cuttings from the borehole. A variety of different additives are required in order to fulfill said functions. For example, weighting agents are added to the drilling fluid in order to increase its density and hydrostatic pressure, so that the formation pressure can be counterbalanced. Rheology modifiers such as organoclays or polymers are added to the drilling fluid in order to attain the desirable shear-thinning, pseudoplastic rheology profile that minimizes energy consumption in the drill bit and facilitates transport of the drill cuttings to the surface. In order to bind the water, which enters into the drilling fluid, hygroscopic additives such as brine are added to the drilling fluid. Furthermore, mineral oils or lubricants are added to the drilling fluid in order to lubricate and clean the drill bit. The resulting drilling fluid is a complex dispersion and/or suspension, which must be kept stable to prevent phase separation, as this, e.g., may cause the weighting agent to separate out from the fluid and sag in the borehole. Therefore, it is common in the art that emulsifiers and/or wetting agents are added to the drilling fluid in order to maintain the desired fluid properties.

The Fluids Engineer has to continuously adapt the composition of the drilling fluid during the drilling process according to the specific requirements of the borehole, such as the borehole depth and the composition of the surrounding formations, and sometimes has to react quickly to sudden changes in the drilling conditions. Therefore, it is also important to easily and reliably deliver drilling fluid additives to the bottom of the borehole during the drilling process.

As an illustrative example, brine is often added to inverse-emulsion drilling fluids because of its hygroscopic properties, so that water, which may enter from formations into the borehole, can be effectively absorbed in the brine in order not to destabilize the drilling fluid, e.g., by causing precipitation or de-emulsification. However, as the brine is diluted and its volume increases, an increased amount of surfactant is required to keep the inverse emulsion stable.

The emulsifiers used in inverse emulsion drilling fluids are often pasty, or highly viscous liquids when handled at room temperature. A further reduction in temperature, as observed when drilling in cold environments, strongly complicates their application. For such applications, emulsifiers are typically diluted in solvents such as mineral oil, imposing an additional burden on transport and packaging. Furthermore, the addition of a diluted emulsifier to a drilling fluid results in the addition of a large amount of unwanted solvents, which influences the overall composition of the drilling fluid and may negatively influence its properties to the point that the drilling fluid becomes unstable. On the other hand, the properties of a drilling fluid should be kept at an optimum, since the operational window may be considerably narrow, in particular for challenging applications, such as high pressure high temperature (HPHT) and horizontal long-reach wells. These solvents can be volatile, chemically reactive or unstable, especially under HPHT conditions, and may cause corrosion of the drilling equipment and destabilization of the drilling fluid. Therefore, it is desired to keep the amount of unwanted additives at a minimum. Furthermore, it is desired to minimize the impact of the unavoidable additives on the properties of the drilling fluid and to minimize unnecessary volume increases of the drilling fluid.

Application WO 2018/034909 A1 relates to a method for introducing an organic drilling fluid additive into an aqueous drilling fluid in a subterranean formation, where the method includes introducing loaded microparticles into an aqueous drilling fluid, which are made by absorbing at least one organic drilling fluid additive onto hybrid calcium carbonate microparticles to form loaded microparticles.

U.S. Pat. No. 6,209,646 B1 refers to methods of controlling the rates of release of chemical additives into treating fluids, wherein a chemical additive is encapsulated in a porous solid material, preferably silica, and when the resulting encapsulated chemical additive is combined with the treating fluid, the chemical additive is released into the treating fluid.

There is still a need for providing means for the controlled delivery of a liquid additive, i.e., a surfactant, to a drilling fluid. Such means, or carrier, preferably allows for an efficient delivery of sufficient amounts of surfactant. Furthermore, it is desirable that the loaded carrier can be easily stored and handled, so that a defined amount of the already loaded carrier can be easily added to the drilling fluid, preferably on site or in the borehole. In addition, there is a need for a carrier that can release the surfactant at a predictable or reliable rate once the loaded mineral carrier is in contact with the drilling fluid.

Furthermore, the properties of the drilling fluid should be minimally affected by the presence of the carrier. In particular, the effect of the carrier on the rheological properties, such as viscosity, yield point and gel strength, and on the fluid loss upon filtration should be minimal. In addition, the drilling fluid comprising the carrier should be stable over extended periods of time, i.e., the properties of the drilling fluid comprising the carrier should be minimally affected by ageing.

Finally, the carrier ideally should not be detrimental to the environment, i.e. should be a natural material.

Accordingly, it is an objective of the present invention to provide means and more specifically a carrier for the delivery of a surfactant to a drilling fluid fulfilling one or more of the requirements as set out above and to provide a drilling fluid comprising said carrier fulfilling one or more of the requirements as set out above.

One or more of the foregoing objectives and other objects are solved by the subject-matter as defined in the appended claims.

Thus, a first aspect of the present invention relates to a drilling fluid comprising
- a. an alkaline earth metal mineral carrier having an intra-particle intruded specific pore volume of at least 0.8 cm$^3$/g, as measured by mercury intrusion porosimetry,
- b. at least one surfactant,
- c. a base fluid,
- d. a thickening agent, and
- e. a weighting agent.

The present inventors surprisingly found that an alkaline earth metal mineral carrier having a high porosity, as reflected by an intra-particle intruded specific pore volume of at least 0.8 g/cm3, can be loaded with suitably high amounts of a surfactant. Furthermore, the resulting loaded mineral carrier is in the form of a free-flowing powder or in the form of free-flowing granules, and thus, can be precisely dosed and mixed with other components to form a drilling fluid. In addition, the alkaline earth metal mineral carrier according to the present invention per se is not detrimental to the environment. The inventors surprisingly found that the properties of the resulting drilling fluid, such as rheological properties, filter fluid loss, and ageing stability are affected only minimally by the presence of the inventive alkaline earth metal mineral carrier.

A second aspect of the present invention relates to a process for producing a drilling fluid, comprising the steps of
- a. providing an alkaline earth metal mineral carrier having an intra-particle intruded specific pore volume of at least 0.8 cm$^3$/g, as measured by mercury intrusion porosimetry,
- b. providing at least one surfactant,
- c. loading the at least one surfactant onto the mineral carrier to obtain a loaded mineral carrier,
- d. preparing a base fluid,
- e. providing a thickening agent, and a weighting agent,
- f. combining, in any order, the base fluid, the thickening agent, the loaded mineral carrier, the weighting agent and optionally further additives to obtain a drilling fluid.

The inventors found that a surfactant may be loaded onto an alkaline earth metal mineral carrier having a specific porosity, as reflected by an intra-particle intruded specific pore volume of at least 0.8 g/cm3. The obtained loaded mineral carrier is stable, can be easily handled and can be dosed in defined amounts to a composition during the manufacture of a drilling fluid or can also can be added during the drilling process for adjusting the amount of surfactant in the composition. The loaded mineral carrier also can be uniformly dispersed in the composition. Upon combining the components of the drilling fluid, the surfactant is released from the mineral carrier at a sufficiently high rate and in a predictable or reliable manner. The properties of the resulting drilling fluid, such as rheological properties, filter fluid loss, and ageing stability are only minimally affected by the presence of the alkaline earth metal mineral carrier.

A third aspect of the present invention relates to the use of a loaded mineral carrier, comprising an alkaline earth metal mineral carrier and at least one surfactant, for the delivery of a surfactant to a drilling fluid, wherein the mineral carrier has an intra-particle intruded specific pore volume of at least 0.8 cm3/g, as measured by mercury intrusion porosimetry.

The present inventors surprisingly found that the inventive loaded mineral carrier can be easily stored and handled, and therefore, can be added to a drilling fluid in defined amounts, even at lower temperatures. The loaded mineral carrier can also be added to the drilling fluid during the drilling process, for example, if formation water intrudes into the borehole and dilutes the drilling fluid, and the drilling fluid has to be kept in stable suspended state by the addition of further surfactant. The surfactant-loaded carrier may be dosed batchwise or continuously.

Advantageous embodiments of the inventive drilling fluid, the inventive process and the inventive use are defined in the corresponding dependent claims.

In one embodiment of any one of the aspects of the present invention, the alkaline earth metal mineral carrier has
- a. an intra-particle intruded specific pore volume in the range from 0.8 to 2.5 cm$^3$/g, preferably from 1.2 to 2.1 cm$^3$/g, and most preferably from 1.5 to 2.0 cm$^3$/g, as measured by mercury intrusion porosimetry, and/or
- b. a BET specific surface area in the range from 10 to 100 m$^2$/g, preferably from 15 to 60 m$^2$/g, and most preferably from 20 to 40 m$^2$/g, measured using nitrogen and the BET method according to ISO 9277:2010, and/or
- c. a ratio of the intra-particle intruded specific pore volume, as measured by mercury intrusion porosimetry, to the BET specific surface area, measured using nitrogen and the BET method according to ISO 9277:2010, of more than 0.01 cm$^3$/m$^2$, preferably more than 0.05 cm$^3$/m$^2$, and most preferably more than 0.06 cm$^3$/m$^2$, such as from 0.06 to 0.25 cm$^3$/m$^2$, and/or
- d. a $d_{50}$ (vol) in the range from 1 to 1000 μm, preferably from 2 to 75 μm, more preferably from 2.5 to 50 μm, even more preferably from 3 to 20 μm, or from 100 to 1000 μm, preferably from 200 to 800 μm, as determined by laser diffraction.

In another embodiment of any one of the aspects of the present invention, the alkaline earth metal mineral carrier has a loading capacity in the range from 50 wt.-% to 250 wt.-%, preferably from 60 wt.-% to 220 wt.-%, more preferably from 70 to 200 wt.-%, wherein the loading capacity is defined as the amount of a surfactant, which can be absorbed by the alkaline earth metal mineral carrier, relative to the weight of the dry alkaline earth metal mineral carrier.

The alkaline earth metal mineral carrier according to the present invention may alternatively or additionally have a load capacity in the range from 30 wt.-% to 75 wt.-%, preferably from 40 wt.-% to 70 wt.-%, more preferably from 50 to 65 wt.-%, wherein the load capacity is defined as the amount of a surfactant, which can be absorbed by the alkaline earth metal mineral carrier, relative to the sum of the weight of the dry alkaline earth metal mineral carrier and the surfactant.

In yet another embodiment of any one of the aspects of the present invention, the alkaline earth metal mineral carrier is selected from the group consisting of alkaline earth metal carbonates, alkaline earth metal phosphates, alkaline earth metal sulphates, alkaline earth metal oxides, alkaline earth metal hydroxides and mixtures thereof, preferably the alkaline earth metal mineral carrier is selected from the group consisting of calcium and/or magnesium carbonates, phosphates, sulphates, oxides, hydroxides and mixtures thereof, more preferably the alkaline earth metal mineral carrier is selected from the group consisting of calcium carbonate, magnesium carbonate and mixtures thereof, and most preferably the alkaline earth metal mineral carrier is selected from the group consisting of precipitated hydromagnesite and surface-reacted calcium carbonate, wherein the surface-reacted calcium carbonate is a reaction product of natural ground or precipitated calcium carbonate with carbon dioxide and one or more H3O+ ion donors in an aqueous medium, wherein the carbon dioxide is formed in situ by the H3O+ ion donor treatment and/or is supplied from an external source and mixtures thereof.

In still another embodiment of any one of the aspects of the present invention, the alkaline earth metal mineral carrier further comprises a surface-treatment layer on at least a part of the surface of the alkaline earth metal mineral carrier, wherein the surface-treatment layer is formed by contacting the untreated alkaline earth metal mineral carrier with a surface-treatment composition comprising at least one surface-treatment agent, preferably wherein the at least one surface-treatment agent is selected from the group consisting of a. at least one mono-substituted succinic anhydride and/or mono-substituted succinic acid and/or a salt thereof, preferably wherein the at least one mono-substituted succinic anhydride and/or mono-substituted succinic acid and/or a salt thereof comprises a linear, branched, aliphatic or cyclic group having a total amount of carbon atoms from at least $C_2$ to $C_{30}$ in the substituent, and/or b. at least one carboxylic acid and/or a salt thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof, and/or c. a phosphoric acid ester blend of one or more phosphoric acid mono-ester and/or salts thereof and/or one or more phosphoric acid di-ester and/or salts thereof, and/or d. at least one aldehyde, and/or e. abietic acid and/or salts thereof, and/or f. at least one polydialkylsiloxane, and/or g. at least one trialkoxysilane, and/or h. mixtures of the materials according to a. to g.

In one embodiment of any one of the aspects of the present invention, the surfactant is selected from the group consisting of cationic surfactants, anionic surfactants, non-ionic surfactants and mixtures thereof, preferably the surfactant is selected from the group consisting of alkyl ethoxylates, quaternary ammonium salts, ethylene oxide/propylene oxide block copolymers, fatty acids and salts thereof, alkyl aryl sulphonates, fatty alcohols, aluminum stearate, non-ionic polyamide emulsifiers and mixtures thereof, and most preferably the surfactant is selected from the group consisting of $C_8$-$C_{22}$ alkyl ethoxylates, $C_6$-$C_{12}$ alkyl phenol alkoxylates, tall oil, tallow oil, salts and derivatives thereof, and mixtures of the foregoing.

In another embodiment of any one of the aspects of the present invention, the drilling fluid comprises a base fluid being an aqueous fluid, an organic fluid, an oil-in-water emulsion comprising an aqueous fluid and an organic fluid, or a water-in-oil emulsion comprising an aqueous fluid and an organic fluid and preferably is a water-in-oil emulsion comprising an aqueous fluid and an organic fluid, and wherein the aqueous fluid is preferably selected from the group consisting of water and aqueous salt solutions, and/or wherein the organic fluid is preferably selected from the group consisting of mineral oils, synthetic oils, synthetic organics, diesel, paraffin, petroleum, olefins, and mixtures thereof.

In one embodiment of the process of the present invention, in step c. the at least one surfactant is loaded onto the alkaline earth metal mineral carrier in an amount of from 50 wt.-% to 250 wt.-%, preferably from 60 wt.-% to 220 wt.-%, more preferably from 70 to 200 wt.-%, based on the total weight of the dry alkaline earth metal mineral carrier.

Alternatively at least one surfactant is loaded onto the alkaline earth metal mineral carrier in an amount of from 30 wt.-% to 75 wt.-%, preferably from 40 wt.-% to 70 wt.-%, more preferably from 50 to 65 wt.-%, based on the total weight of the loaded mineral carrier.

In another embodiment of the process of the present invention, combining step f. comprises the following steps in the following order:

f1. adding the base fluid,
f2. adding the thickening agent,
f3. adding the weighting agent,
f4. adding the loaded mineral carrier, wherein steps f3 and f4 may be performed subsequently or simultaneously.

It should be understood that for the purposes of the present invention, the following terms have the following meaning:

A "surface-reacted calcium carbonate" according to the present invention is a reaction product of ground natural calcium carbonate (GNCC) or precipitated calcium carbonate (PCC) treated with carbon dioxide and one or more H3O+ ion donors, wherein the carbon dioxide is formed in situ by the H3O+ ion donors treatment and/or is supplied from an external source. An H3O+ ion donor in the context of the present invention is a Brønsted acid and/or an acid salt.

The "particle size" of the alkaline earth metal mineral carrier herein, if not explicitly stated otherwise, is described as volume-based particle size distribution dx (vol), or dx. Therein, the value dx (vol) represents the diameter relative to which x % by volume of the particles have diameters less than dx (vol). This means that, for example, the d20 (vol) value is the particle size at which 20 vol. % of all particles are smaller than that particle size. The d50 (vol) value is thus the volume median particle size, also referred to as average particle size, i.e. 50 vol.-% of all particles are smaller than that particle size and the d98 (vol) value, referred to as volume-based top cut particle size, is the particle size at which 98 vol.-% of all particles are smaller than that particle size. If a particle size is given herein as weight-based particle size, then, e.g., the d20 (wt) value is the particle size at which 20 wt.-% of all particles are smaller than that particle size. The d50 (wt) value is thus the weight median particle size, i.e., 50 wt.-% of all particles are smaller than that particle size and the d98 (wt) value, referred to as weight-based top cut particle size, is the particle size at which 98 wt.-% of all particles are smaller than that particle size.

Volume median particle size d50 was evaluated using a Malvern Mastersizer 3000 Laser Diffraction System. The d50 or d98 value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight-based median particle size d50 (wt) and top cut d98 (wt) are measured by the sedimentation method, which is an analysis of sedimentation behaviour in a gravimetric field. The measurement is made with a Sedigraph™

5120 of Micromeritics Instrument Corporation, USA. The method and the instrument are known to the skilled person and are commonly used to determine particle size distributions. The measurement is carried out in an aqueous solution of 0.1 wt. % Na4P2O7. The samples are dispersed using a high speed stirrer and sonication.

Throughout the present document, the term "specific surface area" (in m2/g) refers to the specific surface area as determined by using the BET method (using nitrogen as adsorbing gas), according to ISO 9277:2010. The term "specific surface area" is abbreviated SBET or SSA.

For the purpose of the present invention, the "porosity" or "pore volume" refers to the intra-particle intruded specific pore volume.

The specific pore volume is determined using a mercury intrusion porosimetry measurement using a Micromeritics Autopore V 9620 mercury porosimeter. 100 datapoints up to a maximum applied pressure of mercury 414 MPa (60 000 psi) were collected, equivalent to a Laplace throat diameter of 0.004 μm. The equilibration time used at each pressure step is 20 s. The sample material is sealed in a 3 cm3 chamber powder penetrometer for analysis. The data are corrected for mercury compression, penetrometer expansion and sample material elastic compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 1996, 35(5), 1753-1764).

The total pore volume seen in the cumulative intrusion data can be separated into two regions for the samples, with the initial intrusion data down from 208 m to the first inflection point (d*) showing the coarse packing of the samples between any agglomerate/granule structures contributing strongly. Below these diameters lies the fine interparticle packing of the particles themselves. If they also have intraparticle pores, then this region appears bi-modal, and by taking the specific pore volume intruded by mercury into pores finer than the modal turning point (d**), i.e. finer than the bi-modal point of inflection, the specific intraparticle pore volume is thus approximately defined. The sum of these three regions gives the total overall pore volume of the powder, but depends strongly on the original sample compaction/settling of the powder at the coarse pore end of the distribution.

By taking the first derivative of the cumulative intrusion curve, the pore size distributions based on equivalent Laplace diameter are revealed. The differential curves show the coarse agglomerate pore structure region, the interparticle pore region and the intra-particle pore region, if present. Knowing the intra-particle pore diameter range, it is possible to subtract the interparticle and interagglomerate pore volume from the total pore volume to obtain the desired pore volume of the internal pores in terms of the pore volume per unit mass (specific intra-particle pore volume). The same principle of subtraction, of course, applies for isolating any of the other pore size regions of interest.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

In the following preferred embodiments of the inventive drilling fluid will be set out in more detail. It is to be understood that these embodiments and details also apply to the inventive methods and uses.

The Drilling Fluid

A first aspect of the present invention relates to a drilling fluid, comprising
 a. an alkaline earth metal mineral carrier having an intra-particle intruded specific pore volume of at least 0.8 $cm^3/g$, as measured by mercury intrusion porosimetry,
 b. at least one surfactant,
 c. a base fluid,
 d. a thickening agent, and
 e. a weighting agent.

The Alkaline Earth Metal Mineral Carrier

The inventive drilling fluid, as well as the inventive methods and inventive uses make use of an alkaline earth metal mineral carrier. An "alkaline earth metal mineral" is understood to be an essentially insoluble compound, which comprises at least one type of alkaline earth metal cation. These alkaline earth metals may be beryllium, magnesium, calcium, strontium, barium, or radium. The term "essentially insoluble" refers to a compound, which has a solubility product constant Ksp in water at 25° C. of at most $1\times10-4$, preferably at most $1\times10-5$, and most preferably at most $1\times10-6$.

It is a requirement that the alkaline earth metal mineral carrier has an intra-particle intruded specific pore volume of at least 0.8 cm3/g, as measured by mercury intrusion porosimetry. In a preferred embodiment of the present invention, the intra-particle intruded specific pore volume is in the range from 0.8 to 2.5 cm3/g, preferably from 1.2 to 2.1 cm3/g, and most preferably from 1.5 to 2.0 cm3/g, as measured by mercury intrusion porosimetry.

It is to be understood that the intra-particle intruded specific pore volume represents a measure of the ability of the alkaline earth metal mineral carrier to be loaded with, or to host, suitably high amounts of the at least one surfactant. Without wishing to be bound by theory, it is believed that a high intra-particle intruded specific pore volume allows for the incorporation and loading of high amounts of the surfactant into a single mineral particle of the alkaline earth metal mineral carrier. Thus, the surfactant is absorbed by the alkaline earth metal mineral carrier. As only small amounts of the surfactant are adsorbed onto the outer surface of the alkaline earth metal mineral carrier, the loaded mineral carrier remains a free-flowing powder and can be easily handled and stored.

Thus, a high intra-particle intruded specific pore volume of the alkaline earth metal mineral carrier is indicative of a high loading capacity. The "loading capacity" in the sense of the present invention is defined as the amount of a surfactant, which can be absorbed by the alkaline earth metal mineral carrier, relative to the weight of the dry alkaline earth metal mineral carrier. The loading capacity can be determined by gradually adding the surfactant to the alkaline earth metal mineral carrier and mixing with a spatula until the powder appears homogeneous after each addition. The loading capacity of the material is understood to be the highest amount of surfactant, which can be added to the alkaline earth metal mineral carrier and where after stirring a homogeneous powder, i.e., without clumps, can be obtained. It is to be understood that the loading capacity is largely independent of the specific type of surfactant, which is loaded onto the alkaline earth metal mineral carrier, i.e., the loading capacity of a specific alkaline earth metal mineral carrier will typically differ by less than +10 wt.-%, preferably less than ±5 wt.-%, more preferably less than ±2 wt.-%, between two measurements of the loading capacity, which are performed with different surfactants, respectively. However, for the purposes of the present invention, the corresponding measurement may be carried out with an ethoxylated tallow amine as the surfactant, e.g. with Aduxol® TPA 03-D available from Schärer & Schläpfer AG, Switzerland.

The term "dry alkaline earth metal mineral carrier" is to be understood as referring to a non-loaded alkaline earth metal mineral carrier comprising less than 1 wt.-%, preferably less than 0.5 wt.-%, even more preferably less than 0.3 wt.-% of a liquid component, wherein the liquid component is water and/or another solvent and/or the surfactant.

Thus, in a preferred embodiment, the alkaline earth metal mineral carrier has a loading capacity in the range from 50 wt.-% to 250 wt.-%, preferably from 60 wt.-% to 220 wt.-% and more preferably from 70 to 200 wt.-%.

Alternatively, the "load capacity" may be specified, which refers to the amount of a surfactant, which can be absorbed by the alkaline earth metal mineral carrier, relative to the sum of the weight of the dry alkaline earth metal mineral carrier and the surfactant. The load capacity may be determined in the same manner as the loading capacity.

Thus, in a preferred embodiment, the alkaline earth metal mineral carrier has a load capacity in the range from 30 wt.-% to 75 wt.-%, preferably from 40 wt.-% to 70 wt.-%, more preferably from 50 to 65 wt.-%.

Additionally or alternatively, the alkaline earth metal mineral carrier has a BET specific surface area in the range from 10 to 100 m2/g, preferably from 15 to 60 m2/g, and most preferably from 20 to 40 m2/g, measured using nitrogen and the BET method according to ISO 9277:2010, and/or a ratio of the intra-particle intruded specific pore volume, as measured by mercury intrusion porosimetry, to the BET specific surface area, measured using nitrogen and the BET method according to ISO 9277:2010, of more than 0.01 cm3/m2, preferably more than 0.05 cm3/m2, and most preferably more than 0.06 cm3/m2, such as from 0.06 to 0.25 cm3/m2.

In another preferred embodiment of the present invention, the alkaline earth metal mineral carrier has a d50 (vol) in the range from 1 to 1000 µm, preferably from 2 to 75 µm, more preferably from 2.5 to 50 µm, even more preferably from 3 to 20 µm, or from 100 to 1000 µm, preferably from 200 to 800 µm, as determined by laser diffraction.

For example, if the alkaline earth metal mineral carrier is provided in the form of a powder, it is preferred that the d50 (vol) is in the range from 1 to 1000 µm, preferably from 2 to 75 µm, more preferably from 2.5 to 50 µm, even more preferably from 3 to 20 µm, as determined by laser diffraction. If the alkaline earth metal mineral carrier is provided in the form of granules, it is preferred that the d50 (vol) is in the range from 100 to 1000 µm, preferably from 200 to 800 µm, as determined by laser diffraction.

Granules of the alkaline earth metal mineral carrier may be obtained by granulating a powder of an alkaline earth metal mineral carrier. The granulation equipment may be selected from the conventionally used ones for granulation purposes. Thus, the granulation device may be selected from the group comprising Eirich mixers, fluidized bed dryers/granulators, plate granulators, table granulators, drum granulators, disc granulators, dish granulators, ploughshare mixer, vertical or horizontal mixers, high or low shear mixer, high speed blenders, roller compactor and rapid mixer granulators.

The inventors found that the particle size of the alkaline earth metal mineral carrier preferably should be selected large enough such as to allow for an easy handling of the material on site, e.g., without the need for respiratory protective equipment, but small enough in order to allow for an efficient dispersion in the drilling fluid and to reduce the tendency of settling of the alkaline earth metal mineral carrier within the drilling fluid.

Additionally or alternatively, the alkaline earth metal mineral carrier may have a d50 (wt) in the range from 1 to 1000 µm, preferably from 2 to 75 µm, more preferably from 2.5 to 50 µm, even more preferably from 3 to 20 µm, or from 100 to 1000 µm, preferably from 200 to 800 µm, as determined by the sedimentation method.

In a preferred embodiment of the present invention, the alkaline earth metal mineral carrier is selected from the group consisting of alkaline earth metal carbonates, alkaline earth metal phosphates, alkaline earth metal sulphates, alkaline earth metal oxides, alkaline earth metal hydroxides and mixtures thereof. More preferably, the alkaline earth metal mineral carrier is selected from the group consisting of calcium and/or magnesium carbonates, phosphates, sulphates, oxides, hydroxides and mixtures thereof. Even more preferably, the alkaline earth metal mineral carrier is selected from the group consisting of calcium carbonate, magnesium carbonate and mixtures thereof.

For example, the alkaline earth metal mineral carrier may be one of, or a mixture of a natural ground calcium carbonate or a precipitated calcium carbonate.

"Natural ground calcium carbonate" (GCC) preferably is selected from calcium carbonate containing minerals selected from the group comprising marble, chalk, limestone and mixtures thereof. Natural calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, obtained by precipitation following the reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

According to another embodiment of the present invention, the alkaline earth metal mineral carrier is selected from the group consisting of dolomite, dolomitic and magnesitic marble, limestone, chalk, and precipitated calcium carbonate.

According to still another embodiment of the present invention, the alkaline earth metal mineral carrier is selected from the group consisting of dolomite, dolomitic and magnesitic marble, limestone, and chalk.

In general, the alkaline earth metal mineral carrier may contain at least 60.0 wt.-%, preferably at least 80.0 wt.-%, more preferably at least 90.0 wt.-%, even more preferably at least 95.0 wt.-%, and most preferably from 98.5 to 99.9 wt.-% of an alkaline earth metal mineral, based on the total dry weight of said material.

In a particularly preferred embodiment of the present invention, the alkaline earth metal mineral carrier is selected from the group consisting of precipitated hydromagnesite and surface-reacted calcium carbonate.

Surface-Reacted Calcium Carbonate

According to one preferred embodiment of the present invention, the alkaline earth metal mineral carrier is a surface-reacted calcium carbonate. The surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

A $H_3O^+$ ion donor in the context of the present invention is a Brønsted acid and/or an acid salt.

In a preferred embodiment of the invention the surface-reacted calcium carbonate is obtained by a process comprising the steps of: (a) providing a suspension of natural or precipitated calcium carbonate, (b) adding at least one acid having a pKa value of 0 or less at 20° C. or having a pKa value from 0 to 2.5 at 20° C. to the suspension of step (a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a pKa of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a pKa of greater than 7 at 20° C., associated with the ionisation of the first available hydrogen, and the salt anion of which is capable of forming water-insoluble calcium salts, is additionally provided.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size d50 of 0.05 to 10.0 µm, preferably 0.2 to 5.0 µm, more preferably 0.4 to 3.0 µm, most preferably 0.6 to 1.2 µm, especially 0.7 µm. According to a further embodiment of the present invention, the natural or precipitated calcium carbonate is in form of particles having a weight-based top cut particle size d98 of 0.15 to 55 µm, preferably 1 to 40 µm, more preferably 2 to 25 µm, most preferably 3 to 15 µm, especially 4 µm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a pKa of 0 or less at 20° C.

According to another embodiment, the at least one $H_3O^+$ ion donor is a medium-strong acid having a pKa value from 0 to 2.5 at 20° C. If the pKa at 20° C. is 0 or less, the acid is preferably selected from sulphuric acid, hydrochloric acid, or mixtures thereof. If the pKa at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a pKa value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a pKa of greater than 7, when measured at 20° C., associated with the ionisation of the first available hydrogen, and the salt anion of which is capable of forming water-insoluble calcium salts, is additionally provided. According to the preferred embodiment, the weak acid has a pKa value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4-$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a pKa in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the one or more $H_3O^+$ ion donors and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the one or more $H_3O^+$ ion donors and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with the one or more $H_3O^+$ ion donors and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses and salts thereof.

Alternatively, the aqueous suspension described above can be dried, thereby obtaining the solid (i.e. dry or containing as little water that it is not in a fluid form) surface-reacted natural or precipitated calcium carbonate in the form of granules or a powder.

It is appreciated that the surface-reacted calcium carbonate can be one or a mixture of different kinds of surface-reacted calcium carbonate(s). In one embodiment of the present invention, the surface-reacted calcium carbonate comprises, preferably consists of, one kind of surface-reacted calcium carbonate. Alternatively, the surface-reacted calcium carbonate comprises, preferably consists of, two or more kinds of surface-reacted calcium carbonates. For example, the surface-reacted calcium carbonate comprises, preferably consists of, two or three kinds of surface-reacted calcium carbonates. Preferably, the surface-reacted calcium carbonate comprises, more preferably consists of, one kind of surface-reacted calcium carbonate.

Precipitated Hydromagnesite

In another embodiment of the different aspects of the present invention, the alkaline earth metal mineral carrier is precipitated hydromagnesite. Hydromagnesite or basic magnesium carbonate, which is the standard industrial name for hydromagnesite, is a naturally occurring mineral which is found in magnesium rich minerals such as serpentine and altered magnesium rich igneous rocks, but also as an alteration product of brucite in periclase marbles. Hydromagnesite is described as having the following formula $Mg_5(CO_3)_4(OH)_2 \cdot 4H_2O$.

It should be appreciated that hydromagnesite is a very specific mineral form of magnesium carbonate and occurs naturally as small needle-like crystals or crusts of acicular or bladed crystals. In addition thereto, it should be noted that hydromagnesite is a distinct and unique form of magnesium carbonate and is chemically, physically and structurally different from other forms of magnesium carbonate. Hydromagnesite can readily be distinguished from other magnesium carbonates by X-ray diffraction analysis, thermogravimetric analysis or elemental analysis. Unless specifically described as hydromagnesite, all other forms of magnesium carbonates (e.g. artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 0.5H_2O$), magnesite ($MgCO_3$), barringtonite ($MgCO_3 \cdot 2H_2O$), lansfordite ($MgCO_3 \cdot 5H_2O$) and nesquehonite ($MgCO_3 \cdot 3H_2O$)) are not hydromagnesite within the meaning of the present invention and do not correspond chemically to the formula described above.

Besides the natural hydromagnesite, precipitated hydromagnesites (or synthetic magnesium carbonates) can be prepared. For instance, U.S. Pat. Nos. 1,361,324, 935,418, GB 548,197 and GB 544,907 generally describe the formation of aqueous solutions of magnesium bicarbonate (typically described as "$Mg(HCO_3)_2$"), which is then transformed by the action of a base, e.g., magnesium hydroxide, to form hydromagnesite. Other processes described in the art suggest to prepare compositions containing both, hydromagnesite and magnesium hydroxide, wherein magnesium hydroxide is mixed with water to form a suspension which is further contacted with carbon dioxide and an aqueous basic solution to form the corresponding mixture; cf. for example U.S. Pat. No. 5,979,461. WO 2011/054831 A1 relates to a process for preparing precipitated hydromagnesite in an aqueous environment.

The instant embodiment of the present invention relates to precipitated hydromagnesite. It is appreciated that the precipitated hydromagnesite can be one or a mixture of different kinds of precipitated hydromagnesite(s). In one embodiment of the present invention, the precipitated hydromagnesite comprises, preferably consists of, one kind of precipitated hydromagnesite. Alternatively, the precipitated hydromagnesite comprises, preferably consists of, two or more kinds of precipitated hydromagnesites. For example, the precipitated hydromagnesite comprises, preferably consists of, two or three kinds of precipitated hydromagnesites. Preferably, the precipitated hydromagnesite comprises, more preferably consists of, one kind of precipitated hydromagnesite.

In a further embodiment, the alkaline earth metal mineral carrier of the present invention comprises a mixture of the above-described surface-reacted calcium carbonate and the above-described precipitated hydromagnesite. Preferably, the alkaline earth metal mineral carrier consists of precipitated hydromagnesite.

Thus, in one preferred embodiment of the present invention, the alkaline earth metal mineral carrier is a surface-reacted calcium carbonate having an intra-particle intruded specific pore volume of at least 0.8 cm3/g, as measured by mercury intrusion porosimetry. In a preferred embodiment of the present invention, the intra-particle intruded specific pore volume is in the range from 0.8 to 2.5 cm3/g, preferably from 1.2 to 2.1 cm3/g, and most preferably from 1.5 to 2.0 cm3/g, as measured by mercury intrusion porosimetry, and/or the surface-reacted calcium carbonate has a BET specific surface area in the range from 10 to 100 m2/g, preferably from 15 to 60 m2/g, and most preferably from 20 to 40 m2/g, measured using nitrogen and the BET method according to ISO 9277:2010, and/or a ratio of the intra-particle intruded specific pore volume, as measured by mercury intrusion porosimetry, to the BET specific surface area, measured using nitrogen and the BET method according to ISO 9277:2010, of more than 0.01 cm3/m2, preferably more than 0.05 cm3/m2, and most preferably more than 0.06 cm3/m2, such as from 0.06 to 0.25 cm3/m2, and/or a d50 (vol) in the range from 1 to 1000 µm, preferably from 2 to 75 µm, more preferably from 2.5 to 50 µm, even more preferably from 3 to 20 µm, or from 100 to 1000 µm, preferably from 200 to 800 µm, as determined by laser diffraction.

Thus, in another preferred embodiment of the present invention, the alkaline earth metal mineral carrier is a precipitated hydromagnesite having an intra-particle intruded specific pore volume of at least 0.8 cm3/g, as measured by mercury intrusion porosimetry. In a preferred embodiment of the present invention, the intra-particle intruded specific pore volume is in the range from 0.8 to 2.5 cm3/g, preferably from 1.2 to 2.1 cm3/g, and most preferably from 1.5 to 2.0 cm3/g, as measured by mercury intrusion porosimetry, and/or the precipitated hydromagnesite has a BET specific surface area in the range from 10 to 100 m2/g, preferably from 15 to 60 m2/g, and most preferably from 20 to 40 m2/g, measured using nitrogen and the BET method according to ISO 9277:2010, and/or a ratio of the intra-particle intruded specific pore volume, as measured by mercury intrusion porosimetry, to the BET specific surface area, measured using nitrogen and the BET method according to ISO 9277:2010, of more than 0.01 cm3/m2, preferably more than 0.05 cm3/m2, and most preferably more than 0.06 cm3/m2, such as from 0.06 to 0.25 cm3/m2, and/or a d50 (vol) in the range from 1 to 1000 μm, preferably from 2 to 75 μm, more preferably from 2.5 to 50 μm, even more preferably from 3 to 20 μm, or from 100 to 1000 μm, preferably from 200 to 800 μm, as determined by laser diffraction.

Surface-Treatment Layer

In one embodiment of the present invention, the alkaline earth metal mineral carrier further comprises a surface-treatment layer on at least a part of the surface of the alkaline earth metal mineral carrier, wherein the surface-treatment layer is formed by contacting the untreated alkaline earth metal mineral carrier with a surface-treatment composition comprising at least one surface-treatment agent.

Preferably, the surface-treatment layer is formed by contacting the alkaline earth metal mineral carrier with a surface-treatment composition in an amount from 0.07 to 9 mg/m2 of the alkaline earth metal mineral carrier surface, preferably 0.1 to 8 mg/m2, more preferably 0.11 to 3 mg/m2. The surface-treatment composition comprises at least one surface-treatment agent.

A "surface-treatment agent" in the meaning of the present invention is any material, which is capable of reacting and/or forming an adduct with the surface of the alkaline earth metal mineral carrier, thereby forming a surface-treatment layer on at least a part of the surface of the alkaline earth metal mineral carrier, which preferably renders the carrier surface more hydrophobic. It should be understood that the present invention is not limited to any particular surface-treatment agents. The skilled person knows how to select suitable materials for use as surface-treatment agents.

The present inventors found that a surface-treatment, which renders the surface of the alkaline earth metal mineral carrier more hydrophobic, reduces the interaction of the alkaline earth metal mineral carrier with the surfactant loaded thereon, which facilitates liberation of the surfactant in the drilling fluid. However, it is not a requirement that the alkaline earth metal mineral carrier is surface-treated prior to the loading of the surfactant. More precisely, the present inventors found that the surfactant may also act as a surface-treatment agent by itself, so that a small amount of the surfactant remains bound to the surface alkaline earth metal mineral carrier, and the majority of the surfactant is released into the drilling fluid upon mixing.

In a preferred embodiment, the at least one surface-treatment agent is selected from the group consisting of
  a. at least one mono-substituted succinic anhydride and/or mono-substituted succinic acid and/or a salt thereof, preferably wherein the at least one mono-substituted succinic anhydride and/or mono-substituted succinic acid and/or a salt thereof comprises a linear, branched, aliphatic or cyclic group having a total amount of carbon atoms from at least $C_2$ to $C_{30}$ in the substituent, and/or
  b. at least one carboxylic acid and/or a salt thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof, and/or
  c. a phosphoric acid ester blend of one or more phosphoric acid mono-ester and/or salts thereof and/or one or more phosphoric acid di-ester and/or salts thereof, and/or
  d. at least one aldehyde, and/or
  e. abietic acid and/or salts thereof, and/or
  f. at least one polydialkylsiloxane, and/or
  g. at least one trialkoxysilane, and/or
  h. mixtures of the materials according to a. to g.

According to one embodiment of the present invention, the at least one surface-treatment agent is at least one mono-substituted succinic anhydride and/or mono-substituted succinic acid and/or a salt thereof. In a preferred embodiment, the at least one mono-substituted succinic anhydride and/or mono-substituted succinic acid and/or a salt thereof comprises a linear, branched, aliphatic or cyclic group having a total amount of carbon atoms from at least $C_2$ to $C_{30}$ in the substituent.

According to one embodiment of the present invention, the surface treatment agent comprises at least one mono-substituted succinic anhydride and/or mono-substituted succinic acid and/or a salt thereof.

It is appreciated that the expression "at least one" mono-substituted succinic anhydride and/or mono-substituted succinic acid and/or a salt thereof means that one or more kinds of mono-substituted succinic anhydride and/or mono-substituted succinic acid and/or a salt thereof may be provided in any aspect of the present invention.

According to a preferred embodiment of the present invention, the surface treatment agent comprises at least one mono-substituted succinic anhydride.

It is appreciated that the expression "at least one" mono-substituted succinic anhydride means that one or more kinds of mono-substituted succinic anhydride may be provided in any aspect of the present invention.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride is one kind of mono-substituted succinic anhydride.

It is appreciated that the at least one mono-substituted succinic anhydride represents a surface treatment agent and consists of succinic anhydride mono-substituted with a group selected from any linear, branched, aliphatic, and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic, and cyclic group having a total amount of carbon atoms from C3 to C20 in the substituent. For example, the at least one mono-substituted succinic anhydride consists of succinic anhydride mono-substituted with a group selected from a linear, branched, aliphatic, and cyclic group having a total amount of carbon atoms from C4 to C18 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C2 to C30, preferably from C3 to C20 and most preferably from C4 to C18 in the substituent.

Thus, it is preferred that the at least one mono-substituted succinic anhydride consists of succinic anhydride mono-substituted with one group being a linear or branched, alkyl group having a total amount of carbon atoms from C2 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C2 to C30, preferably from C3 to C20 and most preferably from C4 to C18 in the substituent.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecyl succinic anhydride, octadecyl succinic anhydride, and mixtures thereof.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In a preferred embodiment of the present invention, the at least one mono-substituted succinic anhydride consists of succinic anhydride mono-substituted with one group being a linear or branched alkenyl group having a total amount of carbon atoms from C2 to C30, preferably from C3 to C20 and most preferably from C4 to C20 in the substituent.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, it is appreciated that one alkenyl mono-substituted succinic anhydride is present in an amount of from 20 to 60 wt.-% and preferably of from 30 to 50 wt.-%, based on the total weight of the at least one mono-substituted succinic anhydride provided.

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), it is preferred that the one or more octadecenyl succinic anhydride(s) is present in an amount of from 20 to 60 wt.-% and preferably of from 30 to 50 wt.-%, based on the total weight of the at least one mono-substituted succinic anhydride.

Preferred alkenyl mono-substituted succinic anhydrides include branched hexadecenyl succinic anhydrides (CAS No. 32072-96-1), branched octadecenyl succinic anhydrides (CAS No. 28777-98-2) and 2,5-furandione, dihydro-, mono-C15-20-alkenyl derivatives (CAS No. 68784-12-3). According to a preferred embodiment of the present invention the at least one mono-substituted succinic anhydride is 2,5-furandione, dihydro-, mono-C15-20-alkenyl derivatives (CAS No. 68784-12-3).

It is also appreciated that the at least one mono-substituted succinic anhydride may be a mixture of at least one alkyl mono-substituted succinic anhydride as described hereinabove and at least one alkenyl mono-substituted succinic anhydride as described hereinabove.

If the at least one mono-substituted succinic anhydride is a mixture of at least one alkyl mono-substituted succinic anhydrides and at least one alkenyl mono-substituted succinic anhydride, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60 (wt.-%/wt.-%).

It is appreciated that the at least one mono-substituted succinic anhydride may be provided in the present invention in combination with at least one mono-substituted succinic acid and/or a salt thereof Alternatively, the surface treatment agent may comprise at least one mono-substituted succinic acid and/or a salt thereof.

Accordingly, it should be noted that the at least one mono-substituted succinic acid and/or a salt thereof may be one kind of mono-substituted succinic acid and/or a salt thereof. Alternatively, the at least one mono-substituted succinic acid may be a mixture of two or more kinds of mono-substituted succinic acid and/or a salt thereof. For example, the at least one mono-substituted succinic acid and/or a salt thereof may be a mixture of two or three kinds of mono-substituted succinic acids and/or salts thereof, like two kinds of mono-substituted succinic acids and/or salts thereof.

In one embodiment of the present invention, the at least one mono-substituted succinic acid and/or a salt thereof is one kind of mono-substituted succinic acid and/or a salt thereof.

It is appreciated that the at least one mono-substituted succinic acid and/or a salt thereof represents a surface treatment agent and consists of succinic acid and/or its salt mono-substituted with a group selected from any linear, branched, aliphatic and cyclic group having a total amount of carbon atoms from C2 to C30 in the substituent.

In one embodiment of the present invention, the at least one mono-substituted succinic acid and/or a salt thereof consists of succinic acid and/or its salt mono-substituted with a group selected from a linear, branched, aliphatic and cyclic group having a total amount of carbon atoms from C3 to C20 in the substituent. For example, the at least one mono-substituted succinic acid and/or a salt thereof consists of succinic acid and/or its salt mono-substituted with a group selected from a linear, branched, aliphatic and cyclic group having a total amount of carbon atoms from C4 to C18 in the substituent.

It is appreciated that the at least one mono-substituted succinic anhydride and the at least one mono-substituted succinic acid and/or a salt thereof may comprise the same or different substituent.

In one embodiment of the present invention, the succinic acid molecule and/or its salt of the at least one mono-substituted succinic acid and/or a salt thereof and the succinic anhydride molecule of the at least one mono-substituted succinic anhydride are mono-substituted with the same group selected from any linear, branched, aliphatic and cyclic group having a total amount of carbon atoms from C2 to C30, preferably from C3 to C20 and most preferably from C4 to C18 in the substituent.

If the at least one mono-substituted succinic anhydride is provided in combination with at least one mono-substituted succinic acid and/or a salt thereof, the at least one mono-substituted succinic acid is present in an amount of ≤10 mol.-%, based on the molar sum of the at least one mono-substituted succinic anhydride and the at least one mono-substituted succinic acid and/or its salt. For example, the at least one mono-substituted succinic acid is present in an amount of ≤5 mol.-%, preferably of ≤2.5 mol.-% and most preferably of ≤1 mol.-%, based on the molar sum of the at least one mono-substituted succinic anhydride and the at least one mono-substituted succinic acid and/or its salt.

Additionally or alternatively, the at least one mono-substituted succinic acid is provided in a blend together with the at least one mono-substituted succinic anhydride.

In a particularly preferred embodiment, the surface-treatment layer is formed by contacting the alkaline earth metal mineral carrier with a mixture of alkenyl succinic anhydrides and/or alkenyl succinic acids, wherein the alkenyl succinic anhydrides and/or alkenyl succinic acids are mono-substituted with a group selected from any linear or branched mono-alkenyl group having a total amount of carbon atoms from C12 to C20, preferably from C15 to C20. In this case, the alkenyl succinic anhydride will typically comprise at least 80 wt.-% of the mixture, based on the total weight of the mixture, preferably at least 85 wt.-%, more preferably at least 90 wt.-% and most preferably at least 93 wt.-%.

The surface treatment of inorganic particles with mono-substituted succinic acids and methods for the production thereof are described in WO 2014/060286 A1, WO 2014/128087 A1, and WO 2016/087286 A1.

In another embodiment of the present invention, the surface-treatment agent is at least one carboxylic acid and/or a salt thereof, preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof.

In one embodiment of the present invention, the at least one carboxylic acid is an aliphatic carboxylic acid and/or a salt thereof being selected from saturated unbranched carboxylic acids, that is to say the aliphatic carboxylic acid and/or salt thereof is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid, their salts, their anhydrides and mixtures thereof.

In another embodiment of the present invention, the at least one carboxylic acid is an aliphatic carboxylic acid and/or a salt thereof being selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid, their salts, and mixtures thereof.

Preferably, the aliphatic carboxylic acid and/or salt thereof is stearic acid and/or a stearic acid salt or stearic anhydride.

For example, the at least one carboxylic acid and/or a salt thereof is selected from alkenyl carboxylic acids and/or salts thereof and is preferably selected from the group of carboxylic acids consisting of pentenoic acid, hexenoic acid, heptenoic acid, octenoic acid, nonenoic acid, decenoic acid, undecenoic acid, dodecenoic acid, tridecenoic acid, myristoleic acid, pentadecenoic acid, palmitoleic acid, sapienic acid, heptadecenoic acid, oleic acid, elaidic acid, vaccenic acid, nonadecenoic acid, paullinic acid, gadoleic acid, gondoic acid, erucic acid, nervonic acid, linoleic acid, their salts, their anhydrides and isomers and/or mixtures thereof.

In another embodiment of the present invention, the alkenyl carboxylic acid and/or a salt thereof is selected from the group consisting of decenoic acid, dodecenoic acid, myristoleic acid, palmitoleic acid, oleic acid, paullinic acid, their salts, and isomers and/or mixtures thereof.

More preferably, the alkenyl carboxylic acid and/or salt thereof is selected from the group consisting of myristoleic acid, palmitoleic acid, sapienic acid, oleic acid, elaidic acid, vaccenic acid, linoleic acid, α-linolenic acid and mixtures thereof. Most preferably, the alkenyl carboxylic acid and/or salt thereof is oleic acid and/or linoleic acid, preferably oleic acid or linoleic acid, most preferably linoleic acid.

Additionally or alternatively, the surface treatment agent is a salt of a carboxylic acid.

The term "salt of a carboxylic acid" refers to a carboxylic acid, wherein the active acid group is partially or completely neutralized. The term "partially neutralized" carboxylic acid refers to a degree of neutralization of the active acid groups in the range from 40 and 95 mol %, preferably from 50 to 95 mol %, more preferably from 60 to 95 mol-% and most preferably from 70 to 95 mol-%. The term "completely neutralized" carboxylic acid refers to a degree of neutralization of the active acid groups of >95 mol %, preferably of >99 mol %, more preferably of >99.8 mole-% and most preferably of 100 mol-%. Preferably, the active acid groups are partially or completely neutralized.

The salt of the carboxylic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the surface treatment agent is a salt of oleic acid and/or linoleic acid, preferably oleic acid or linoleic acid, most preferably linoleic acid.

Additionally or alternatively, the at least one surface treatment agent is a phosphoric acid ester blend of one or more phosphoric acid mono-ester and/or salts thereof and/or one or more phosphoric acid di-ester and/or salts thereof.

Thus, the phosphoric acid ester blend may be a blend of one or more phosphoric acid mono-esters and one or more phosphoric acid di-esters and optionally one or more phosphoric acid tri-esters. In one embodiment, said blend further comprises phosphoric acid.

For example, the phosphoric acid ester blend is a blend of one or more phosphoric acid mono-ester and one or more phosphoric acid di-ester. Alternatively, the phosphoric acid ester blend is a blend of one or more phosphoric acid mono-ester and one or more phosphoric acid di-ester and phosphoric acid. Alternatively, the phosphoric acid ester blend is a blend of one or more phosphoric acid mono-ester and one or more phosphoric acid di-ester and one or more phosphoric acid tri-ester. Alternatively, the phosphoric acid ester blend is a blend of one or more phosphoric acid mono-ester and one or more phosphoric acid di-ester and one or more phosphoric acid tri-ester and phosphoric acid.

For example, said blend comprises phosphoric acid in an amount of ≤8 mol.-%, preferably of ≤6 mol.-%, and more preferably of ≤4 mol.-%, like from 0.1 to 4 mol.-%, based on the molar sum of the compounds in the blend.

The term "phosphoric acid mono-ester" in the meaning of the present invention refers to an o-phosphoric acid molecule mono-esterified with one alcohol molecule selected from branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid tri-ester" in the meaning of the present invention refers to an o-phosphoric acid molecule tri-esterified with three alcohol molecules selected from the same or different, branched or linear, aliphatic or aromatic alcohols having a total amount of carbon atoms from C6 to C30, preferably from C8 to C22, more preferably from C8 to C20 and most preferably from C8 to C18 in the alcohol substituent.

Additionally or alternatively, the surface treatment agent is a salt of a phosphoric acid ester. In one embodiment, the salt of a phosphoric acid ester may further comprise minor amounts of a salt of phosphoric acid.

According to one embodiment of the present invention, the surface-treatment composition comprises a phosphoric acid ester blend of one or more phosphoric acid mono-ester and/or salts thereof and/or one or more phosphoric acid di-ester and/or salts thereof.

In one embodiment of the present invention, the one or more phosphoric acid mono-ester consists of an o-phosphoric acid molecule esterified with one alcohol selected from saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from saturated, branched or linear, aliphatic or aromatic alcohols having a total amount of carbon atoms from C8 to C22, more preferably from C8 to C20 and most preferably from C8 to C18 in the alcohol substituent.

Alkyl esters of phosphoric acid are well known in the industry especially as surfactants, lubricants and antistatic agents (Die Tenside; Kosswig und Stache, Carl Hanser Verlag Munchen, 1993).

The synthesis of alkyl esters of phosphoric acid by different methods and the surface treatment of minerals with alkyl esters of phosphoric acid are well known to the skilled man, e.g. from Pesticide Formulations and Application Systems: 17th Volume; Collins H M, Hall F R, Hopkinson M, STP1268; Published: 1996, U.S. Pat. Nos. 3,897,519 A, 4,921,990 A, 4,350,645 A, 6,710,199 B2, 4,126,650 A, 5,554,781 A, EP 1092000 B1 and WO 2008/023076 A1.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from C6 to C30 in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid di-ester means that one or more kinds of phosphoric acid di-ester may be present in the treatment layer of the surface-treated material product and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

The term "salt of phosphoric acid ester" refers to a phosphoric acid ester, wherein the active acid group(s) is/are partially or completely neutralized. The term "partially neutralized" phosphoric acid esters refers to a degree of neutralization of the active acid group(s) in the range from 40 and 95 mole-%, preferably from 50 to 95 mole-%, more preferably from 60 to 95 mole-% and most preferably from 70 to 95 mole-%. The term "completely neutralized" phosphoric acid esters refers to a degree of neutralization of the active acid group(s) of >95 mole-%, preferably of >99 mole-%, more preferably of >99.8 mole-% and most preferably of 100 mole-%. Preferably, the active acid group(s) is/are partially or completely neutralized.

The salt of the phosphoric acid ester is preferably a compound selected from the group consisting of sodium, potassium, calcium, magnesium, lithium, strontium, primary amine, secondary amine, tertiary amine and/or ammonium salts thereof, whereby the amine salts are linear or cyclic.

According to another embodiment of the present invention, the surface-treatment composition comprises at least one aliphatic aldehyde.

In this regard, the at least one aliphatic aldehyde represents a saturated surface treatment agent and may be selected from any linear, branched or alicyclic, substituted or non-substituted, saturated or aliphatic aldehyde. Said aldehyde is preferably chosen such that the number of carbon atoms is greater than or equal to 6 and more preferably greater than or equal to 8. Furthermore, said aldehyde has generally a number of carbon atoms that is lower or equal to 14, preferably lower or equal to 12 and more preferably lower or equal to 10. In one preferred embodiment, the number of carbon atoms of the aliphatic aldehyde is between 6 and 14, preferably between 6 and 12 and more preferably between 6 and 10. Suitable aldehydes suitable for use in the present invention are known to the skilled person, e.g., from WO 2011/147802 A1. Additionally or alternatively, the at least one surface treatment agent is abietic acid (also named: abieta-7,13-dien-18-oic acid, CAS-No.: 514-10-3).

Additionally or alternatively, the surface treatment agent is a salt of abietic acid.

The term "salt of abietic acid" refers to abietic acid, wherein the active acid groups are partially or completely neutralized. The term "partially neutralized" abietic acid refers to a degree of neutralization of the active acid groups in the range from 40 and 95 mol-%, preferably from 50 to 95 mol %, more preferably from 60 to 95 mol-% and most preferably from 70 to 95 mol-%. The term "completely neutralized" abietic acid refers to a degree of neutralization of the active acid groups of >95 mol %, preferably of >99 mol %, more preferably of >99.8 mol-% and most preferably of 100 mol-%. Preferably, the active acid groups are partially or completely neutralized, more preferably completely neutralized.

The salt of abietic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic.

According to one embodiment the at least one surface-treatment agent is a polydialkylsiloxane. Preferred polydialkylsiloxanes are, e.g., described in US 2004/0097616 A1. Most preferred are polydialkylsiloxanes selected from the group consisting of polydimethylsiloxane, preferably dimethicone, polydiethylsiloxane and polymethylphenylsiloxane and/or mixtures thereof.

According to another embodiment of the present invention, the at least one surface-treatment agent is an a trialkoxysilane, which is represented by the formula R3-Si(OR4)3. Therein, the substituent R3 represents any kind of substituent, i.e., any branched, linear or cyclic moiety having a total amount of carbon atoms from C2 to C30, such as a methyl, ethyl, propyl, butyl, decyl, dodecyl, hexadecyl, octadecyl, allyl, propargyl, butenyl, crotyl, prenyl, pentenyl, hexenyl, cyclohexenyl or vinylphenyl moiety. OR4 is a hydrolyzable group, wherein substituent R4 represents any saturated or unsaturated, branched, linear, cyclic or aromatic moiety from having a total amount of carbon atoms from C1 to C30, such as a methyl, ethyl, propyl, allyl, butyl, butenyl, phenyl or benzyl group. According to a preferred embodiment, R4 is a linear alkyl group having a total amount of carbon atoms from C1 to C15, preferably from C1 to C8 and most preferably from C1 to C2. According to an exemplified embodiment of the present invention, the hydrolysable alkoxy group is a methoxy or an ethoxy group. Thus, specific or preferred examples of trialkoxysilanes suitable for use in the present invention include vinyltrimethoxysilane, vinyltriethoxysilane, allyltrimethoxysilane or allyltriethoxysilane.

It is appreciated that the surface-treatment layer on at least a part of the alkaline earth metal mineral carrier is formed by contacting the alkaline earth metal mineral carrier with the surface-treatment agent as described hereinabove. The alkaline earth metal mineral carrier is contacted with the surface-treatment agent or composition in an amount from 0.07 to 9 mg/m2 of the alkaline earth metal mineral surface, preferably 0.1 to 8 mg/m2, more preferably 0.11 to 3 mg/m2. A chemical reaction may take place between the alkaline earth metal mineral carrier and the surface treatment agent. In other words, the surface-treatment layer may comprise the surface treatment agent and/or salty reaction products thereof.

The term "salty reaction products" of the surface-treatment agent refers to products obtained by contacting the alkaline earth metal mineral carrier with the surface-treatment composition comprising the surface-treatment agent. Said reaction products are formed between at least a part of the applied surface-treatment agent and reactive molecules located at the surface of the alkaline earth metal mineral carrier.

For example, if the surface-treatment layer is formed by contacting the alkaline earth metal mineral carrier with the mono- or di-substituted succinic anhydride, the surface-treatment layer may further comprise a salt formed from the reaction of the mono- or di-substituted succinic anhydride with the alkaline earth metal mineral carrier. Likewise, if the surface-treatment layer is formed by contacting the alkaline earth metal mineral carrier with stearic acid, the surface-treatment layer may further comprise a salt formed from the reaction of stearic acid with the alkaline earth metal mineral carrier. Analogous reactions may take place when using alternative surface treatment agents according to the present invention.

According to one embodiment, the salty reaction product(s) of the mono- or di-substituted succinic anhydrides are one or more calcium and/or magnesium salts thereof.

According to one embodiment the salty reaction product(s) of the mono- or di-substituted succinic anhydrides formed on at least a part of the surface of the alkaline earth metal mineral carrier are one or more calcium salts and/or one or more magnesium salts thereof.

According to one embodiment the molar ratio of the mono- or di-substituted succinic anhydrides to the salty reaction product(s) thereof is from 99.9:0.1 to 0.1:99.9, preferably from 70:30 to 90:10.

According to one embodiment of the present invention, the alkaline earth metal mineral carrier comprises, and preferably consists of, an untreated alkaline earth metal mineral carrier and a treatment layer comprising mono- or di-substituted succinic anhydride containing compounds comprising unsaturated carbon moieties and/or salt reaction products thereof. The treatment layer is formed on at least a part of the surface, preferably on the whole surface, of said alkaline earth metal mineral carrier.

In one embodiment of the present invention, the treatment layer formed on the surface of the alkaline earth metal mineral carrier comprises the at least one mono-substituted succinic anhydride and/or salty reaction products thereof obtained from contacting the untreated alkaline earth metal mineral carrier with the at least one mono-substituted succinic anhydride.

Methods for preparing a surface-treatment layer with at least one phosphoric acid ester blend and suitable compounds for coating are described, e.g., in EP 2 770 017 A1, which is thus incorporated herewith by reference.

Methods for preparing a surface-treatment layer with at least one mono-substituted succinic anhydride consisting of succinic anhydride mono-substituted with a group selected from a linear, branched, aliphatic and cyclic group having a total amount of carbon atoms from at least C2 to C30 in the substituent and suitable compounds for coating are described e.g. in WO 2016/023937 A1, which is thus incorporated herewith by reference.

If the surface-treatment layer is formed by contacting the alkaline earth metal mineral carrier with a surface-treatment composition comprising two or more surface-treatment agents, it is to be understood that the two or more surface-treatment agents may be provided as a mixture prior to contacting the alkaline earth metal mineral carrier with the surface-treatment composition. Alternatively, the alkaline earth metal mineral carrier may be contacted with a surface-treatment composition comprising the first surface-treatment agent, and the second surface-treatment agent is added subsequently, that is, the surface-treatment composition is formed upon contacting the mixture of the alkaline earth metal mineral carrier and the first surface-treatment agent with the second surface-treatment agent.

In one embodiment of the present invention, the surface treatment is carried out in the wet state, i.e. the surface treatment is carried out in the presence of an aqueous solvent, preferably water.

Thus, the alkaline earth metal mineral carrier may be provided in form of an aqueous suspension having a solids content in the range from 5 to 80 wt.-%, based on the total weight of the aqueous suspension. According to a preferred embodiment, the solids content of the aqueous suspension is in the range from 10 to 70 wt.-%, more preferably in the range from 15 to 60 wt.-% and most preferably in the range from 15 to 40 wt.-%, based on the total weight of the aqueous suspension.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water. Suitable wet surface-treatment processes are known to the skilled person, and taught, e.g., in EP 3 192 837 A1.

In another embodiment, the surface-modification is performed in the dry state, i.e. the surface treatment is carried out in the absence of solvents. In this embodiment, the untreated alkaline earth metal mineral carrier, which may contain a residual amount of moisture, e.g., less than 10 wt.-%, preferably less than 5 wt.-%, more preferably less than 2 wt.-%, is contacted with the surface-treatment composition, and subsequently mixed. Suitable dry surface-treatment processes are known to the skilled person.

The Surfactant

The drilling fluid of the present invention comprises at least one surfactant. It is appreciated that the term "surfactant" means any substance and/or mixture of substances which has surface-active properties and which consists of one or more hydrophilic, and one or more hydrophobic groups of such a nature and size that it is capable of reducing the surface tension of water, and/or of forming spreading or adsorption monolayers at the water-air interface, and/or of forming emulsions and/or microemulsions and/or micelles, and/or of adsorption at water-solid interfaces. The term "emulsifier" is used synonymously throughout the present document and more specifically refers to the ability of the surfactant to form and/or stabilize emulsions and/or microemulsions and/or micelles.

In particular, the surfactant is added to the drilling fluid to stabilize oil-in-water emulsions and inverse emulsions, to improve fluid rheology, to disperse solids, to account for the intrusion of water from formations surrounding the borehole into the drilling fluid, and for other additional purposes. Therefore, the present invention is not limited to any particular kind of surfactant.

In one embodiment of the present invention, the surfactant may be selected from anionic surfactants, cationic surfactants, amphoteric surfactants and nonionic surfactants.

Anionic surfactants suitable for use in the present invention can be any anionic surfactant known for the kind of drilling fluid to be prepared. For example, the anionic surfactant is selected from the group comprising alkane sulphonates, olefin sulphonates, fatty acid ester sulphonates, such as methyl or ethyl ester sulphonates, alkyl aryl sulphonates, alkyl phosphonates, alkyl ether phosphonates, taurates, alkyl ether carboxylates, fatty acids, C8-C22 alkyl sulphates, C8-C22 alkylbenzene sulphates and salts thereof, C8-C22 alkyl alkoxy sulphates and salts thereof, such as sodium lauryl ether sulphate, C12-C22 methyl ester sulphonates and salts thereof, C12-C22 alkylbenzene sulphonates and salts thereof, such as sodium dodecylbenzenesulphonate, C12-C22 fatty acid soaps and salts thereof and mixtures thereof.

Nonionic surfactants suitable for use in the present invention can be any nonionic surfactant known for the kind of drilling fluid to be prepared. For example, the nonionic surfactant is selected from the group comprising alkyl ethoxylates, such as C8-C22 alkyl ethoxylates, C6-C12 alkyl phenol alkoxylates, alkylpolysaccharides, alkyl polyglucoside surfactants, glucamides, methylesteralkoxylates, alkoxylated alcohols, such as alkoxylated C12-C22 alcohols, polyamide emulsifiers, ethylene oxide/propylene oxide block copolymers, fatty alcohols, fatty alcohol alkoxylates, optionally modified fatty alcohol alkoxylates, ethoxylated or propoxylated sorbitan esters, polyhydroxy fatty acid amides, rhamnolipids, glucoselipids, lipopeptides and mixtures thereof.

Cationic surfactants suitable for use in the present invention can be any cationic surfactant known for the kind of drilling fluid to be prepared. For example, useful cationic surfactants can be selected from fatty amines, quaternary ammonium salts, esterquats, i.e. quaternized fatty acid surfactants, and mixtures thereof.

Amphoteric surfactants suitable for use in the present invention can be any amphoteric surfactant known for the kind of drilling fluid to be prepared. For example, the amphoteric surfactants can be selected from aliphatic derivatives of secondary or tertiary amines and/or aliphatic derivatives of heterocyclic secondary and tertiary amines in which the aliphatic radical can be a straight- or branched-chain.

In a preferred embodiment of the present invention, the surfactant is selected from the group consisting of alkyl ethoxylates, quaternary ammonium salts, ethylene oxide/propylene oxide block copolymers, fatty acids and salts thereof, alkyl aryl sulphonates, fatty alcohols, aluminum stearate, non-ionic polyamide emulsifiers and mixtures thereof, and most preferably the surfactant is selected from the group consisting of C8-C22 alkyl ethoxylates, C6-C12 alkyl phenol alkoxylates, tall oil, tallow oil, salts and derivatives thereof, and mixtures of the foregoing.

The term "non-ionic polyamide emulsifier" is understood to refer to non-ionic polyamide emulsifiers based on fatty acids cross-linked with polyamines. Suitable examples of non-ionic polyamide emulsifiers are known to the skilled person.

In one exemplary embodiment, the surfactant is selected from fatty acids and salts thereof. Suitable fatty acids include saturated and unsaturated fatty acids, i.e., saturated and unsaturated carboxylic acids, such as those described above within context of the surface-treatment agents. Suitable salts of fatty acids include calcium and magnesium salts of saturated and unsaturated fatty acids. An illustrative example of a fatty acid suitable for use as a surfactant in the present invention is linoleic acid.

In another exemplary embodiment, the surfactant is selected from tall oil, tallow oil, salts and derivatives thereof. Salts of tall oil and tallow oil suitable for use in the present invention include calcium salts and magnesium salts of tall oil and tallow oil. The tall oil or tallow oil may optionally be derivatized, for example, by oxidation, by derivatization to a tallow amine, e.g. by reaction with a monoamine, diamine or polyamine, by ethoxylation or alkoxylation or by a combination of two or more of the aforementioned derivatization processes. An illustrative example of a tallow oil derivative suitable for use in the present invention is an ethoxylated tallow amine, such as those available from Schärer+Schläpfer under the tradename Aduxol, for example, ethoxylated tallow propylene diamine Aduxol TPA-03 D.

In any of the foregoing embodiments, the term "ethoxylated" or "alkoxylated" is understood to relate to the modification of the respective compound by the addition of an (oligo)ethyleneoxy group —(CH2-CH2-O-)n or alkyleneoxy group —(Y—O-)n, respectively, wherein Y=alkylene group having from 2 to 6 carbon atoms and n=1 to 200, preferably 3 to 40.

It is appreciated that the term "at least one" surfactant indicates that also a mixture of two or more surfactants may be present in the drilling fluid.

The Base Fluid

The inventive drilling fluid, as well as the inventive methods and inventive uses make use of a base fluid. The base fluid is selected to support, i.e., suspend and/or dissolve, the required drilling fluid components.

In a preferred embodiment of the present invention, the base fluid is an aqueous fluid, an organic fluid, an oil-in-water emulsion comprising an aqueous fluid and an organic fluid, or a water-in-oil emulsion comprising an aqueous fluid and an organic fluid, preferably a water-in-oil emulsion comprising an aqueous fluid and an organic fluid, and wherein the aqueous fluid is preferably selected from the group consisting of water and aqueous salt solutions, and/or wherein the organic fluid is preferably selected from the group consisting of mineral oils, synthetic oils, synthetic organics, diesel, paraffin, petroleum, olefins, and mixtures thereof.

In one embodiment of the present invention, the aqueous salt solution is selected from the group consisting of seawater, brackish water, partially saturated or saturated salt solutions of sodium chloride, potassium chloride, calcium chloride, sodium formate and/or potassium formate, and mixtures thereof.

In a particularly preferred embodiment of the present invention, the base fluid is a water-in-oil emulsion, or inverse emulsion, comprising a continuous phase of an organic fluid, preferably diesel or synthetic oil, and a discontinuous phase of an aqueous fluid, preferably an aqueous solution of calcium chloride capable of absorbing water, which may enter into the drilling fluid from the surrounding formations. Water-in-oil emulsions may have desirable suspension properties for particulate materials, such as weighting agents or drill cuttings. It is a requirement that a water-in-oil emulsion is stabilized by at least one surfactant, such as those described hereinabove.

If the base fluid is a water-in-oil emulsion, it is preferred that the relative amounts by weight of the organic fluid to the aqueous fluid are in the range from 10:1 to 1:10, preferably from 5:1 to 1:5, more preferably from 3:1 to 1:3, and most preferably from 2:1 to 1:2, for example 2:1.

If the base fluid is an oil-in-water emulsion, it is preferred that the relative amounts by weight of the organic fluid to the aqueous fluid are in the range from 10:1 to 1:10, preferably from 5:1 to 1:5, more preferably from 3:1 to 1:3, and most preferably from 2:1 to 1:2, for example 2:1.

The Thickening Agent

The inventive drilling fluid, as well as the inventive methods and inventive uses make use of a thickening agent. The thickening agent is selected in order to provide the desired rheological properties to the drilling fluid. It is preferred that the viscosity of the drilling fluid is high enough to keep all components in suspension, but low enough to facilitate drilling. Furthermore, the drilling fluid should exhibit a thixotropic behavior, i.e., it should transition to a gel at low or absent shearing forces in order to support the borehole, if no drilling is performed.

Preferably, the thickening agent is added to the composition in an amount such that the drilling fluid has a viscosity in the range from 30 to 500 dial readings at 600 rpm, preferably from 50 to 250 dial readings at 600 rpm, as determined by a Fann model 35 viscosimeter at 50° C. Additionally or alternatively, the thickening agent may be added to the composition in an amount such that the drilling fluid has a plastic viscosity PV in the range from 15 to 250 cP, preferably from 20 to 125 cP and more preferably from 25 to 80 cP. The plastic viscosity is defined as the difference between the dial reading at 600 rpm and the dial reading at 300 rpm when measured by a Fann model 35 viscosimeter at 50° C. Additionally or alternatively, the thickening agent may be added to the composition in an amount such that the drilling fluid has a yield point YP from 1 to 50 lbs/100 ft2 (48.8 to 2441.2 g/m2), preferably from 2 to 40 lbs/100 ft2 (97.6 to 1953.0 g/m2) and more preferably from 3 to 30 lbs/100 ft2 (146.5 to 1464.7 g/m2). The yield point is defined as the difference between the dial reading at 300 rpm and the plastic viscosity when measured by a Fann model 35 viscosimeter at 50° C.

Additionally or alternatively, the thickening agent is added to the composition in an amount such that the drilling fluid has a viscosity in the range from 15 to 250 mPas at 600 rpm, preferably from 25 to 125 mPas at 600 rpm, as determined by a Fann model 35 viscosimeter at 50° C.

In a preferred embodiment, the thickening agent is selected from the group consisting of inorganic particles, preferably clay, kaolin, bentonite, montmorillonite and organoclays; xanthan gum, carboxymethylcellulose, starch, guar gum, glycols, hydroxyethyl cellulose, vinyl acetate-maleic anhydride copolymer, polyacrylonitrile, partially hydrolyzed polyacrylonitrile, polyanionic cellulose, salts and mixtures thereof, and preferably is selected from the group consisting of attapulgite, bentonite (optionally treated with soda ash or a dispersant), carboxymethyl cellulose, polyanionic cellulose, sepiolite, starch, xanthan gum, salts and mixtures thereof.

If the thickening agent is an inorganic particle, it is preferred that the inorganic particle has an intra-particle intruded specific pore volume of less than 0.8 cm3/g, as measured by mercury intrusion porosimetry. Thus, it is to be understood that the alkaline earth metal mineral carrier does not represent a thickening agent for the purposes of the present invention. Preferably, the thickening agent has a particle size as specified by the American Petroleum Institute, so that the thickening agent, e.g., comprises less than or equal to 3 wt.-% of particles larger than 75 μm.

In particularly preferred embodiment, the thickening agent meets the requirements of the API Specification 13A, 18th Edition, August 2010.

In another embodiment of the present invention, the thickening agent may be selected from the group consisting of pH responsive thickeners, such as a copolymer formed from a monomer selected from ethyl acrylate, ethyl methacrylate and/or other vinyl monomers and a comonomer selected from tristyrylpoly(ethyleneoxy)methyl acrylate, mixed metal hydroxides, mixed metal silicates, metal-cross-linked phosphate esters and mixtures thereof, optionally in combination with a thickening agent selected from the group consisting of clay, kaolin, bentonite, montmorillonite, organoclays, xanthan gum, carboxymethylcellulose, starch, guar gum, glycols, hydroxyethyl cellulose, vinyl acetate-maleic anhydride copolymer, polyacrylonitrile, partially hydrolyzed polyacrylonitrile, polyanionic cellulose, salts and mixtures thereof.

The Weighting Agent

The inventive drilling fluid, as well as the inventive methods and inventive uses make use of a weighting agent. The type of weighting agent, which is selected for a particular drilling fluid according to the invention, may depend on the nature of the base fluid. In one embodiment of the present invention, the weighting agent is regardless of the base fluid a particulate mineral, preferably having a high specific gravity. In one embodiment, the specific gravity of the weighting agent is at least 2.5 g/cm$^3$, preferably at least 3.5 g/cm$^3$.

It is to be understood that the primary purpose of the weighting agent is to increase the density of the drilling fluid. Therefore, it is preferred that the shape of the particles of the weighting agent is "compact", e.g., spherical, ovoid, cubic or cuboid. Furthermore, it is preferred that the intra-particle intruded specific pore volume is below 0.8 cm3/g, as measured by mercury intrusion porosimetry. Thus, it is to be understood that the inventive alkaline earth metal mineral carrier does not represent a weighting agent for the purposes of the present invention.

Preferably, the weighting agent has a particle size as specified by the American Petroleum Institute, so that the weighting agent comprises less than or equal to 3 wt.-% of particles larger than 75 μm and less than or equal to 30 wt.-% of particles smaller than 6 μm.

In particularly preferred embodiment, the thickening agent meets the requirements of the API Specification 13A, 18th Edition, August 2010.

Preferably, the weighting agent is added to the drilling fluid in an amount sufficient to obtain a drilling fluid having a density in the range from 10 ppg (pounds per gallon, lb/gal) to 30 ppg (1.20 to 3.59 g/cm3), preferably from 14 ppg to 22 ppg (1.80 to 3.00 g/cm3) and more preferably from 16 ppg to 20 ppg (2.16 to 2.64 g/cm3).

In a preferred embodiment, the weighting agent is selected from the group consisting of calcium carbonate, dolomite, celestite, barite, hematite, siderite, ilmenite, synthetic iron oxide, manganese tetroxide, galena and mixtures thereof. Preferably, the weighting agent is selected from the group consisting of celestite, barite, hematite, siderite, ilmenite and mixtures thereof, and most preferably, the weighting agent is barite.

Alternatively, it may be desired to reduce the mud weight, for example, in underbalanced drilling applications. In such embodiment, the weighting agent may be hollow glass particles.

In one embodiment of the present invention, the base fluid is water-based, and the weighting agent is a soluble salt. The water phase of the water-based fluid may be saturated with the soluble salt. Preferably, the soluble salt is selected from the group comprising halides of alkali metal ions, halides of alkaline earth metal ions, formates of alkali metal ions, formates of alkaline earth metal ions and mixtures thereof, and more preferably is selected from the group comprising sodium chloride, sodium formate, calcium chloride, potassium chloride, potassium formate, sodium bromide, potassium bromide, calcium bromide and mixtures thereof.

Further Additives

In another embodiment of the present invention, the inventive drilling fluid further comprises one or more additives selected from the group comprising pH control agents, bactericides, corrosion inhibitors, calcium scavenging agents, deflocculants, defoaming agents, fluid loss agents, filtrate reducers, flocculants, foaming agents, hydrate suppressants, lubricants, pipe freeing agents, shale control inhibitors, surface active agents, temperature stability agents, thinners, dispersants, viscosifiers, thinning agents, oxygen scavengers, hydrogen sulfide scavengers and mixtures of the foregoing.

In one embodiment, the drilling fluid comprises a deflocculant, preferably selected from polyacrylates, polyphosphates, lignosulfates, tannic acid derivatives or mixtures thereof.

In one embodiment, the drilling fluid comprises a pH control agent, preferably selected from the group comprising Brønsted acids, Brønsted bases, buffering agents and mixtures thereof An exemplary pH control agent suitable for use in the present invention includes milk of lime, i.e., an aqueous solution of calcium hydroxide.

In one embodiment, the drilling fluid comprises a fluid loss agent (also termed lost circulation agent). The fluid loss agent may be added in order to prevent or reduce loss of the drilling fluid, which may flow into one or more geological formations, by the formation of a filter cake on the walls of the borehole. The fluid loss agent may be selected from the group consisting of calcium carbonate, mica, cellulosic plant particles, graphite, dolomite, asphalt, sulfonated asphalt, uintaite, bentonite, sodium carboxymethyl cellulose, pregelatinized starch, encapsulated lime, encapsulated oil-absorbent polymers, hydrolyzed poly(acrylonitrile), cross-linked divinylsulfone, poly(galactomannan) gum, polyurethane foam, partially hydrolyzed poly(acrylamide) crosslinked with chromium(III), oat hulls, rice products, waste olive pulp, nut cork, pulp residue waste, petroleum coke, shredded cellophane, anionic polymers formed from an organic phosphate ester and a trialkoxyaluminum derivative, cement, in-situ curing polymers and mixtures thereof.

In one embodiment, the drilling fluid comprises a thinning agent. A thinning agent may be added, e.g., during the drilling process, to adjust the viscosity to a desirable level. The thinning agent may be selected from the group comprising phosphates, polyphosphates, lignite mud, quebracho mud (red mud), lignosulfate mud and mixtures thereof.

In another embodiment, the drilling fluid comprises a lubricant. A lubricant may be added to reduce friction during the drilling process in order to reduce rotational torque. Thereby, the wear on the drilling equipment is reduced, the rate of penetration is increased and the chance for a stuck-pipe, or a stuck drill, is minimized. The lubricant may be selected from the group comprising molybdenum disulfide, graphite, polarized graphite (a composition comprising graphite and a molybdate and/or tungstenate), ellipsoidal glass granules, paraffins, olefins containing from 8 to 30 carbon atoms, preferably from 14 to 18 carbon atoms, phospholipids (e.g., cocamidopropyl propylene glycol diammonium chloride phosphate), phosphatides, alcohols (e.g., oleyl alcohol, 2-octyldecanol, 2-ethylhexylglucoside, stearyl alcohol, poly(etherglycol), mono- and di-glycerides of fatty acids), aminoalcohols (e.g., obtained by the reaction of polymerized linseed oil with diethanol amine), poly(alkylene glycol), poly(vinyl alcohol) (optionally cross-linked by a cross-linking agent preferably selected from the group comprising formaldehyde, acetaldehyde, glyoxal, glutaraldehyde, maleic acid, oxalic acid, dimethylurea, poly(acrolein), diisocyanate, divinylsulfonate and mixtures thereof), ester-based oils, phosphate esters, starch-olefin copolymers and mixtures thereof.

In still another embodiment, the drilling fluid comprises a shale control inhibitor. The shale control inhibitor reduces the tendency of shale and clay formations to swell upon their contact with the drilling fluid. The shale control inhibitor may be selected from the group comprising potassium chloride, quaternary ammonium salts (e.g., choline salts, such as choline chloride and quaternized dimethylamino ethyl methacrylate), poly(acrylamide), partially hydrolyzed poly(vinylacetate), anionic copolymers, cationic copolymers (e.g., poly(dimethyldiallylammonium chloride)), amine salts of maleic imide, potassium formate, saccharide derivatives, sulfonated asphalt, copolymers of styrene and maleic anhydride grafted with poly(ethylene glycol), poly(oxyalkylene amine)s (also named poly(ether amine)s, e.g., poly(oxyalkylenediamine)s), shale encapsulators, membrane-forming agents and mixtures thereof.

In yet another embodiment, the drilling fluid comprises a bactericide, preferably selected from the group comprising bis(tetrakis(hydroxymethyl)phosphonium)sulfate, dimethyltetrahydrothiadiazinethione, 2-bromo-4-hydroxyacetophenone, thiocyanomethylthiobenzothiazole, dithiocarbamic acid, hydroxamic acid, 1,2-benzoisothiazolin-3-one, 4,5-dichloro-2-N-octyl-isothiazolin-3-one, 3-(3,4-dichlorophenyl)-1,1-dimethylurea, diiodomethyl4-methylphenyl sulfone, isothiazolinones and mixtures thereof.

In one embodiment, the drilling fluid comprises a corrosion inhibitor, preferably selected from the group comprising acetylinic alcohol, tall oil fatty acid anhydrides, 3-phenyl-2-propyn-1-ol, dicyclopentadiene dicarboxylic acid salts, hydroxamic acid, cyclohexylammonium benzoate, acyl derivatives of trishydroxyethyl-perhydro-1,3,5-triazine, 2,4-diamino-6-mercapto pyrimidine sulfate, combined with oxysalts of vanadium, niobium, tantalum, titanium, zirconium or hafnium, aqueous alkanol amine solution, quaternized fatty esters of alkoxylated alkyl-alkylene diamines, mercaptoalcohols, polysulfides, polyphosphonohydroxybenzene sulfonic acid compounds, 1-hydroxyethylidene-1, 1-diphosphonic acid, 2-hydroxyphosphonoacetic acid, water-soluble 1,2-dithiol-3-thiones, sulfonated alkyl phenols, polythioethers, thiazolidines, substituted thiacrown ethers pendent on vinyl polymers, benzylsulfinylacetic acid or benzylsulfonylacetic acid, halohydroxyalkylthio-substituted and dihydroxyalkylthio-substituted polycarboxylic acids, alkyl-substituted thiourea, 2,5-bis(N-pyridyl)-1,3,4-oxadiazoles, 1,2-propylene diamine, trimethylene diamine, 1,4-butanediamine, naphthenic acids, betaines, collidine, propargyl alcohol, benzimidazol, benzotriazol, thiourea, 2,5-bis(N-pyridyl)-1,3,4-oxadiazole, cyclohexylammonium benzoate, benzylsulfonylacetic acid, 2,4-diamino-6-mercapto pyrimidine, 3-phenyl-2-propyn-1-ol, dicyclopentadiene dicarboxylic acid and mixtures thereof.

In another embodiment, the drilling fluid comprises an oxygen scavenger being hydrazine and/or a hydrogen sulfide scavenger selected from the group comprising iron and zinc compounds, preferably iron(II) oxalate, iron sulfate, ferrous gluconate and mixtures thereof.

In yet another embodiment, the drilling fluid comprises a temperature stability agent. The temperature stability agent reduces the extent of viscosity reduction of the drilling fluid at increased temperatures. The temperature stability agent may be selected from the group comprising formate salts and polysaccharides, for example xanthan gum.

In still another embodiment of the present invention, the drilling fluid comprises a dispersant, preferably selected from the group comprising zirconium complexes, wherein the ligand is selected from di-, tri- or oligocarboxylic acids, such as citric acid, tartaric acid, malic acid and lactic acid; aluminum citrate, maleic anhydride copolymers, polyacrylic acid, polycarboxylates, allyloxybenzensulfonate, sulfonated isobutylene maleic anhydride copolymers, phosphate oxidized starch, sulfonated asphalt, humic acids, salts and mixtures thereof.

Even further additives, as well as weighting agents, base fluids, thickening agents and surfactants suitable for use in the present invention are known to the skilled person.

The Composition of the Drilling Fluid

It is appreciated that the amounts of the alkaline earth metal mineral carrier, the at least one surfactant, the base fluid, the thickening agent and the weighting agent in the drilling fluid may vary widely due to the different types of drilling fluids and specific requirements of the borehole.

However, it is preferred that the surfactant is present in the drilling fluid in an amount ranging from 0.01 wt.-% to 5 wt.-%, preferably from 0.05 wt.-% to 2.5 wt.-%, and more preferably from 0.1 wt.-% to 2.0 wt.-%, based on the total weight of the drilling fluid.

Additionally or alternatively, it is preferred that the alkaline earth metal mineral carrier is present in the drilling fluid in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid.

In a preferred embodiment of the present invention, the drilling fluid comprises an alkaline earth metal mineral carrier selected from the group consisting of precipitated hydromagnesite and surface-reacted calcium carbonate, wherein the surface-reacted calcium carbonate is a reaction product of natural ground or precipitated calcium carbonate with carbon dioxide and one or more H3O+ ion donors in an aqueous medium, wherein the carbon dioxide is formed in situ by the H3O+ ion donor treatment and/or is supplied from an external source and mixtures thereof, in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid, and optionally, the drilling fluid further comprises at least one surfactant selected from the group consisting of alkyl ethoxylates, quaternary ammonium salts, ethylene oxide/propylene oxide block copolymers, fatty acids and salts thereof, alkyl aryl sulphonates, fatty alcohols, aluminum stearate, non-ionic polyamide emulsifiers and mixtures thereof in an amount ranging from 0.01 wt.-% to 5 wt.-%, preferably from 0.05 wt.-% to 2.5 wt.-%, and more preferably from 0.1 wt.-% to 2.0 wt.-%, based on the total weight of the drilling fluid.

In a further preferred embodiment of the present invention, the drilling fluid comprises an alkaline earth metal mineral carrier selected from the group consisting of precipitated hydromagnesite and surface-reacted calcium carbonate, wherein the surface-reacted calcium carbonate is a reaction product of natural ground or precipitated calcium carbonate with carbon dioxide and one or more H3O+ ion donors in an aqueous medium, wherein the carbon dioxide is formed in situ by the H3O+ ion donor treatment and/or is supplied from an external source and mixtures thereof, in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid, a surfactant, preferably in an amount ranging from 0.01 wt.-% to 20 wt.-%, more preferably from 0.05 wt.-% to 15 wt.-%, even more preferably from 0.1 wt.-% to 10 wt.-%, and most preferably from 0.15 wt.-% to 5 wt.-%, based on the total weight of the drilling fluid, and optionally, the drilling fluid further comprises a base fluid being a water-in-oil emulsion comprising an organic fluid and an aqueous fluid preferably being an aqueous solution of calcium chloride and an organic fluid.

In another preferred embodiment of the present invention, the drilling fluid comprises an alkaline earth metal mineral carrier selected from the group consisting of precipitated hydromagnesite and surface-reacted calcium carbonate, having an intra-particle intruded specific pore volume in the range from 0.8 to 2.5 cm3/g, preferably from 1.2 to 2.1 cm3/g, and most preferably from 1.5 to 2.0 cm3/g, as measured by mercury intrusion porosimetry, and/or a BET specific surface area in the range from 10 to 100 m2/g, preferably from 15 to 60 m2/g, and most preferably from 20 to 40 m2/g, measured using nitrogen and the BET method according to ISO 9277:2010, in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid, a surfactant, preferably in an amount ranging from 0.01 wt.-% to 20 wt.-%, more preferably from 0.05 wt.-% to 15 wt.-%, even more preferably from 0.1 wt.-% to 10 wt.-%, and most preferably from 0.15 wt.-% to 5 wt.-%, based on the total weight of the drilling fluid, and optionally, the drilling fluid further comprises a base fluid being a water-in-oil emulsion comprising an organic fluid and an aqueous fluid preferably being an aqueous solution of calcium chloride and an organic fluid.

Preferably, the base fluid is present in the drilling fluid in an amount ranging from 15 wt.-% to 95 wt.-%, more preferably from 20 wt.-% to 80 wt.-%, even more preferably from 25 wt.-% to 60 wt.-%, and most preferably from 25 wt.-% to 50 wt.-%, based on the total weight of the drilling fluid.

Preferably, the weighting agent is present in the drilling fluid in an amount ranging from 5 wt.-% to 95 wt.-%, more preferably from 15 wt.-% to 90 wt.-%, even more preferably from 30 wt.-% to 85 wt.-% and most preferably from 50 wt.-% to 80 wt.-%, based on the total weight of the drilling fluid.

Preferably, the thickening agent is present in the drilling fluid in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid.

Preferably, further additives may be present in the drilling fluid in a total amount ranging from 0.001 wt.-% to 50 wt.-%, preferably from 0.01 wt.-% to 40 wt.-%, more preferably from 0.1 wt.-% to 30 wt.-% and most preferably from 0.5 wt.-% to 25 wt.-%, based on the total weight of the drilling fluid. Preferably, the further additives are present in the drilling fluid in an amount ranging from 0.001 wt.-% to 30 wt.-% each, preferably from 0.01 wt.-% to 25 wt.-% each, more preferably from 0.1 wt.-% to 20 wt.-% each and most preferably from 0.5 wt.-% to 10 wt.-% each, based on the total weight of the drilling fluid.

Thus, in an exemplary embodiment, the inventive drilling fluid comprises:

an alkaline earth metal mineral carrier having an intra-particle intruded specific pore volume of at least 0.8 cm$^3$/g, as measured by mercury intrusion porosimetry, in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid, preferably wherein the alkaline earth metal mineral carrier is selected from the group consisting of precipitated hydromagnesite and surface-reacted calcium carbonate, a. at least one surfactant in an amount ranging from 0.01 wt.-% to 20 wt.-%, more preferably from 0.05 wt.-% to 15 wt.-%, even more preferably from 0.1 wt.-% to 10 wt.-%, and most preferably from 0.15 wt.-% to 5 wt.-%, based on the total weight of the drilling fluid, b. a base fluid in an amount ranging from 15 wt.-% to 95 wt.-%, more preferably from 20 wt.-% to 80 wt.-%, even more preferably from 25 wt.-% to 60 wt.-%, and most preferably from 25 wt.-% to 50 wt.-%, based on the total weight of the drilling fluid, preferably wherein the base fluid is a water-in-oil emulsion comprising an organic fluid and an aqueous fluid, more preferably being an aqueous solution of calcium chloride and an organic fluid, c. a thickening agent in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid, d. a weighting agent in an amount ranging from 5 wt.-% to 95 wt.-%, more preferably from 15 wt.-% to 90 wt.-%, even more preferably from 30 wt.-% to 85 wt.-% and most preferably from 50 wt.-% to 80 wt.-%, based on the total weight of the drilling fluid, and e. optionally further additives in a total amount ranging from 0.001 wt.-% to 50 wt.-%, preferably from 0.01 wt.-% to 40 wt.-%, more preferably from 0.1 wt.-% to 30 wt.-% and most preferably from 0.5 wt.-% to 25 wt.-%, based on the total weight of the drilling fluid.

It is appreciated that certain compounds may be added to the drilling fluid to fulfill more than one task, i.e., such compounds fall under more than one of the types of drilling fluid components as outlined above and may be mentioned more than once in the present document. An illustrative example is potassium chloride, which may represent in form of its aqueous solution a base fluid, a weighting agent and a shale control inhibitor. It is to be understood that such compounds are added to the drilling fluid in an amount required to fulfill the desired function, and at the same time may fulfill further functions as described above. In other words, the above-mentioned amounts of the drilling fluid components are not to be understood as being cumulative, i.e., these amounts must not be added up, if a drilling fluid component is intended to fulfill more than one function.

However, it is appreciated that the alkaline earth metal mineral carrier having an intra-particle intruded specific pore volume of at least 0.8 cm3/g, as measured by mercury intrusion porosimetry, represents a specific material, which does not fall within any of the other mentioned or claimed drilling fluid additives, more specifically, any alkaline earth metal mineral, which is mentioned within context of the thickening agent, weighting agent or further additives. Therefore, insoluble, particulate thickening agents, weighting agents or further additives, preferably have an intra-particle intruded specific pore volume of less than 0.8 cm3/g, as measured by mercury intrusion porosimetry.

Preferably, the drilling fluid has a viscosity in the range from 30 to 500 dial readings at 600 rpm, preferably from 50 to 250 dial readings at 600 rpm, as determined by a Fann model 35 viscosimeter at 50° C. Additionally or alternatively, the drilling fluid has a plastic viscosity PV in the range from 15 to 300 cP, preferably from 20 to 125 cP and more preferably from 25 to 80 cP. The plastic viscosity is defined as the difference between the dial reading at 600 rpm and the dial reading at 300 rpm when measured by a Fann model 35 viscosimeter at 50° C. Additionally or alternatively, the drilling fluid has a yield point YP from 1 to 50 lbs/100 ft2 (48.8 to 2441.2 g/m2), preferably from 2 to 40 lbs/100 ft2 (97.6 to 1953.0 g/m2) and more preferably from 3 to 30 lbs/100 ft2 (146.5 to 1464.7 g/m2). Additionally or alternatively, the drilling fluid has a viscosity in the range from 15 to 250 mPas at 600 rpm, preferably from 25 to 125 mPas at 600 rpm, as determined by a Fann model 35 viscosimeter at 50° C.

Preferably, the drilling fluid has a density in the range from 10 ppg (pounds per gallon, lb/gal) to 30 ppg (1.20 to 3.59 g/cm3), preferably from 14 ppg to 22 ppg (1.80 to 3.00 g/cm3) and more preferably from 16 ppg to 20 ppg (2.16 to 2.64 g/cm3).

The Process for Producing a Drilling Fluid

A second aspect of the present invention relates to a process for producing a drilling fluid. The process comprises the steps of a. providing an alkaline earth metal mineral carrier having an intra-particle intruded specific pore volume of at least 0.8 cm$^3$/g, as measured by mercury intrusion porosimetry, b. providing at least one surfactant, c. loading the at least one surfactant onto the mineral carrier to obtain a loaded mineral carrier, d. preparing a base fluid, e. providing a thickening agent, and a weighting agent, f. combining, in any order, the base fluid, the thickening agent, the loaded mineral carrier, the weighting agent and optionally further additives to obtain a drilling fluid.

It is appreciated that the alkaline earth metal mineral carrier provided in step a., the at least one surfactant provided in step b., the base fluid prepared in step d., the thickening agent and weighting agent provided in step e. and the further additives of step f. are as described hereinabove.

Step a.—Provision of an Alkaline Earth Metal Mineral Carrier

According to step a. of the process of the present invention, an alkaline earth metal mineral carrier is provided. The alkaline earth metal mineral carrier is described hereinabove.

The alkaline earth metal mineral carrier may be provided in any form, for example, as suspension, slurry, dispersion, paste, powder, moist filter cake or in pressed or granulated form. According to one embodiment, the alkaline earth metal mineral carrier is provided in dry form, preferably in form of a powder.

According to another embodiment, the alkaline earth metal mineral carrier is provided in form of an aqueous suspension. According to one embodiment, the alkaline earth metal mineral carrier is in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the weight of the aqueous suspension. According to a preferred embodiment of the present invention, the aqueous suspension consists of water and the alkaline earth metal mineral carrier. Alternatively, the aqueous suspension of the alkaline earth metal mineral carrier may comprise further additives, for example, a dispersant. A suitable dispersant may be selected from the group comprising homopolymers or copolymers of polycarboxylic acid or salts thereof based on, for example, acrylic acid, methacrylic acid, maleic acid, fumaric acid or itaconic acid, and acrylamide, or mixtures thereof. Homopolymers or copolymers of acrylic acid are especially preferred. The homopolymer or copolymer can be fully in the acidic form or partially or fully neutralized. The weight average molecular weight Mw of such products is preferably in the range from 2 000 to 15 000 g/mol, with a weight average molecular weight Mw from 3 000 to 7 000 g/mol or 3 500 to 6 000 g/mol being especially preferred. According to an exemplary embodiment, the dispersant is sodium polyacrylate having a weight average molecular weight Mw from 2 000 to 15 000 g/mol, preferably from 3 000 to 7 000 g/mol, and most preferably from 3 500 to 6 000 g/mol.

Step b.—Provision of at Least One Surfactant

According to step b. of the process of the present invention, at least one surfactant is provided. The surfactant is as described hereinabove. The at least one surfactant may be provided in any form, for example, as solution, suspension, slurry, dispersion, paste or powder.

According to another embodiment, the at least one surfactant is provided in form of a suspension or dispersion, preferably an aqueous suspension or dispersion. Suitable solvents are known to the skilled person and may comprise water, methanol, ethanol, acetone, acetonitrile, tetrahydrofuran, butanone, ethyl acetate, dimethyl sulfoxide, dimethyl formamide, and mixtures thereof.

According to one embodiment, the at least one surfactant is in form of a dispersion, preferably aqueous dispersion, having a content of the at least one surfactant within the range from 1 to 90 wt.-%, preferably from 3 to 60 wt.-%, more preferably from 5 to 40 wt.-%, and most preferably from 10 to 25 wt.-%, based on the weight of the aqueous dispersion. According to a preferred embodiment of the present invention, the aqueous dispersion consists of water and the at least one surfactant.

The aqueous dispersion of the at least one surfactant may comprise further additives, for example, one of the aforementioned dispersants.

According to still another embodiment, the at least one surfactant is provided in form of a solution, preferably an aqueous solution. Suitable solvents are known to the skilled person and may comprise water, methanol, ethanol, n-butanol, isopropanol, n-propanol, acetone, acetonitrile, tetrahydrofuran, butanone, ethyl acetate, dimethyl sulfoxide, dimethyl formamide, and mixtures thereof.

According to a preferred embodiment, the at least one surfactant is in form of a solution, preferably aqueous solution, comprising the at least one surfactant in an amount from 1 to 95 wt.-%, preferably from 10 to 90 wt.-%, more preferably from 20 to 80 wt.-%, and most preferably from 30 to 70 wt.-%, based on the weight of the aqueous solution, or in an amount from 1 to 10 wt.-%, preferably 1 to 3 wt.-%, based on the total weight of the aqueous solution.

In one embodiment, the at least one surfactant is preferably provided heated to a temperature where their Brookfield viscosity (measured with a No. 3 Spindle, 100 rpm) lies below 1 000 mPa·s, preferably in the range from 100 to 1 000 mPa·s, provided that such a temperature does not lead to the chemical degradation of the at least one surfactant. Such a temperature might be, for example, from 25 to 70° C., preferably from 30 to 60° C. and most preferably from 40 to 55° C.

Step c.—Loading of the Alkaline Earth Metal Mineral Carrier

The loading of the alkaline earth metal mineral carrier of step a. with the at least one surfactant of step b. may be carried out in any manner known by the skilled person. The loading is preferably carried out under mixing. The mixing may be carried out under conventional mixing conditions. The skilled person will adapt these mixing conditions (such as the configuration of mixing pallets and mixing speed) according to his process equipment. It is appreciated that any mixing method which would be suitable to form the loaded mineral carrier may be used.

It is appreciated that the alkaline earth metal mineral carrier of step a. is loaded with the at least one surfactant of step b. by loading step c. to form the loaded mineral carrier.

The loading may be achieved by adding the at least one surfactant to the alkaline earth metal mineral carrier.

According to the present invention, the alkaline earth metal mineral carrier is defined to be loaded, if the specific surface area is at least partially covered and/or the intra-particle pore volume of same is at least partially filled by the at least one surfactant, and if present, the solvent in which the at least one surfactant is dissolved. For example, the alkaline earth metal mineral carrier is loaded, if the specific surface area is at least partially covered and/or the intra-particle pore volume of same is at least partially filled by at least 10 wt. %, preferably at least 40 wt. %, more preferably at least 60 wt. %, and most preferably at least 80 wt. %, e.g. at least 90 wt. %, based on the total weight of the alkaline earth metal mineral carrier, with the at least one surfactant, and if present, the solvent in which the at least one surfactant is dissolved. Preferably, the alkaline earth metal mineral carrier is loaded, if the specific surface area is at least partially covered and/or the intra-particle pore volume of same is at least partially filled by 10 to 300 wt.-%, more preferably from 50 to 250 wt.-%, even more preferably from 60 to 220 wt.-%, and most preferably from 70 to 200 wt.-%, e.g. from 90 to 180 wt.-%, based on the weight of the dry alkaline earth metal mineral carrier, with the at least one surfactant, and if present, the solvent in which the at least one surfactant is dissolved. Alternatively, the alkaline earth metal mineral carrier is at least partially filled by 30 wt.-% to 75 wt.-%, preferably from 40 wt.-% to 70 wt.-%, more preferably from 50 to 65 wt.-%, based on the total weight of the alkaline earth metal mineral carrier including the at least one surfactant (i.e., the loaded mineral carrier), and if present, the solvent in which the at least one surfactant is dissolved.

It is appreciated that process step c. can be carried out over a broad temperature and/or pressure range, provided that the at least one surfactant is in liquid form. For example, process step c. is carried out in a temperature range from 5 to 200° C., preferably from 10 to 120° C. and most preferably from 10 to 100° C. at ambient pressure conditions, i.e. at atmospheric pressure. Alternatively, process step c. is carried out in a temperature range from 5 to 200° C., preferably from 10 to 120° C. and most preferably from 10 to 100° C. at reduced pressure conditions, e.g. a pressure of from 100 to 700 mbar.

In one embodiment, process step c. is carried out at ambient temperature and pressure conditions, e.g., at room temperature, such as from about 5 to 35° C., preferably from 10 to 30° C. and most preferably from 15 to 25° C., and at atmospheric pressure. This embodiment preferably applies in case the at least one surfactant is liquid at room temperature or dissolved in a solvent.

In another embodiment, process step c. is carried out at a temperature where the Brookfield viscosity (measured with a No. 3 Spindle, 100 rpm) of the at least one surfactant provided in step b. lies below 1 000 mPa·s, preferably in the range from 100 to 1 000 mPa·s, provided that such a temperature does not lead to the chemical degradation of the at least one surfactant. Such a temperature might be, for example, from about 25 to 70° C., preferably from 30 to 60° C. and most preferably from 40 to 55° C.

In case the at least one surfactant is dissolved in a solvent, the solvent is preferably removed after process step c. by evaporation. Thus, the process optionally comprises a step of removing the solvent by evaporation if such a solvent is used in step b. In this embodiment, the process thus preferably comprises a further step of separating the prepared loaded mineral carrier from the excess solvent.

If the solvent is removed by evaporation, this is preferably achieved by drying means selected from the group comprising drying in a rotational oven, jet-drying, fluidized bed drying, freeze drying, flash drying, spray drying and temperature-controlled high or low shear mixer.

Preferably, loading step c. is performed in the absence of a solvent.

Thus, it is preferred that in step c., the at least one surfactant is loaded onto the alkaline earth metal mineral carrier in an amount of from 50 wt.-% to 250 wt.-%, preferably from 60 wt.-% to 220 wt.-%, more preferably from 70 to 200 wt.-%, based on the total weight of the dry alkaline earth metal mineral carrier.

Alternatively, the at least one surfactant is loaded onto the alkaline earth metal mineral carrier in an amount of from 30 wt.-% to 75 wt.-%, preferably from 40 wt.-% to 70 wt.-%, more preferably from 50 wt.-% to 65 wt.-%, based on the total weight of the loaded mineral carrier.

In the case that two or more surfactants are provided in step a., said two or more surfactants can be provided as a mixture, optionally dissolved or dispersed in a solvent as outlined above. However, said two or more surfactants may also be provided separately, and may be loaded onto the alkaline earth metal mineral carrier in two separate substeps, wherein each step can be performed as outlined above. For example, a first surfactant can be loaded onto the alkaline earth metal mineral carrier in an amount sufficient to essentially cover the surface of the alkaline earth metal mineral carrier, and subsequently, a second surfactant can be loaded onto the alkaline earth metal mineral carrier to at least partially fill the intra-particle pores of the alkaline earth metal mineral carrier.

Optionally, the inventive process further comprises a step c1. of forming the loaded alkaline earth metal mineral carrier into granules. If step c1. is performed in the inventive process, it is preferred that the alkaline earth metal mineral carrier provided in step a) is not provided in granulated form. The granulation equipment may be selected from the conventionally used ones for granulation purposes. Thus, the granulation device may be selected from the group comprising Eirich mixers, fluidized bed dryers/granulators, plate granulators, table granulators, drum granulators, disc granulators, dish granulators, ploughshare mixer, vertical or horizontal mixers, high or low shear mixer, high speed blenders, roller compactor and rapid mixer granulators. If the loaded alkaline earth metal mineral carrier is formed into granules, it is preferred that the d50 (vol) of said granules is in the range from 100 to 1000 μm, preferably from 200 to 800 μm, as determined by laser diffraction.

Step d.—Preparation of a Base Fluid

According to step d. of the process of the present invention, a base fluid is prepared. It is appreciated that the base fluid is as described hereinabove.

In the case where the base fluid is water, sea water, brackish water or an organic fluid, said base fluid may be provided by any means known to the skilled person. In the case where the base fluid is an aqueous salt solution, said aqueous salt solution may be prepared by dissolving the corresponding salt in water.

In the case where the base fluid is an oil-in-water emulsion or a water-in-oil emulsion comprising an aqueous fluid and an organic fluid, it is preferred that in a first step, either the aqueous fluid or the organic fluid is mixed with a surfactant as described hereinabove. The surfactant may be the same or different from the at least one surfactant provided in step b.

If the aqueous fluid has been mixed with the surfactant in the first step, the organic fluid is subsequently added and mixed. If the organic fluid has been mixed with the surfactant in the first step, the aqueous fluid is subsequently added and mixed.

Suitable mixing devices, i.e., homogenizers, are known to the skilled person and include, e.g., stirring devices, shaking devices, pumping devices, such as circulating pumps, colloidal mills, bead mills, atomizers and ultrasonic devices. Preferably, the base fluid is prepared by stirring and/or pumping, such as circulating with a pump.

Step e.—Provision of a Thickening Agent and a Weighting Agent

According to step e. of the process of the present invention, a thickening agent and a weighting agent are provided. It is appreciated that the thickening agent and weighting agent provided in step e. are as described hereinabove.

Step f.—Combining of the Drilling Fluid Components

According to step f. of the process of the present invention, the loaded mineral carrier obtained in step c., the base fluid prepared in step d., the thickening agent and weighting agent provided in step e. and optionally further additives are combined in any order. It is appreciated that the further additives are as described hereinabove.

Combining step f. may be performed by any conventional means known to the skilled person. Preferably, the contacting is carried out under mixing and/or homogenizing conditions. The skilled person will adapt these mixing and/or homogenizing conditions such as the mixing speed and temperature according to his process equipment. For example, the mixing and homogenizing may take place by means of a ploughshare mixer, which is well known to the skilled person. Further suitable mixing devices are known to the skilled person and include, e.g., stirring devices and shaking devices.

In a preferred embodiment, combining step f. is performed in a certain order to take into account potential incompatibilities of compounds and/or to reduce the potential for destabilization of the drilling fluid during combining step f.

In one embodiment, it is preferred that the following steps are performed in the following order:
f1. adding the base fluid,
f2. adding the thickening agent,
f3. adding the weighting agent,
f4. adding the loaded mineral carrier,
wherein steps f3 and f4 may be performed subsequently or simultaneously.

In other words, it is important that the base fluid is added first, and afterwards, the thickening agent is added. Thereafter, the weighting agent and the loaded mineral carrier may be added in any order, for example, subsequently or simultaneously. However, it may be preferred that the weighting agent is added last. Further additives, if present, may be added in between or during any one of steps f1 to f4.

In another embodiment of the present invention, steps f1 to f3 may be performed in any order, and afterwards, step f4 is performed. It may be desirable or required to adjust the composition of the drilling fluid during the drilling process to account for changes in the surrounding formations or an increasing depth of the borehole. Thus, it may be required to add a defined amount of a surfactant in an easy and reliable way, i.e., in the form of a loaded mineral carrier, directly to the drilling fluid within the borehole.

In any of the embodiments of the process of the present invention, the loaded mineral carrier may be added in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-%, based on the total weight of the drilling fluid.

Preferably, the base fluid is added to the drilling fluid in an amount ranging from 15 wt.-% to 95 wt.-%, more preferably from 20 wt.-% to 80 wt.-%, even more preferably from 25 wt.-% to 60 wt.-%, and most preferably from 25 wt.-% to 50 wt.-%, based on the total weight of the drilling fluid.

Preferably, the thickening may be added in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-%, based on the total weight of the drilling fluid.

Preferably, the weighting agent is added to the drilling fluid in an amount ranging from 5 wt.-% to 95 wt.-%, more preferably from 15 wt.-% to 90 wt.-%, even more preferably from 30 wt.-% to 85 wt.-% and most preferably from 50 wt.-% to 80 wt.-%, based on the total weight of the drilling fluid.

Preferably, the further additives are added to the drilling fluid in a total amount ranging from 0.001 wt.-% to 50 wt.-%, preferably from 0.01 wt.-% to 40 wt.-%, more preferably from 0.1 wt.-% to 30 wt.-% and most preferably from 0.5 wt.-% to 25 wt.-%, based on the total weight of the drilling fluid. Preferably, the further additives are added to the drilling fluid in an amount ranging from 0.001 wt.-% to 30 wt.-% each, preferably from 0.01 wt.-% to 25 wt.-% each, more preferably from 0.1 wt.-% to 20 wt.-% each and most preferably from 0.5 wt.-% to 10 wt.-% each, based on the total weight of the drilling fluid.

Thus, in a particularly preferred embodiment of the process of the present invention, an alkaline earth metal mineral carrier selected from the group consisting of precipitated hydromagnesite and surface-reacted calcium carbonate, wherein the surface-reacted calcium carbonate is a reaction product of natural ground or precipitated calcium carbonate with carbon dioxide and one or more H3O+ ion donors in an aqueous medium, wherein the carbon dioxide is formed in situ by the H3O+ ion donor treatment and/or is supplied from an external source and mixtures thereof, is provided in step a., at least one surfactant selected from the group consisting of alkyl ethoxylates, quaternary ammonium salts, ethylene oxide/propylene oxide block copolymers, fatty acids and salts thereof, alkyl aryl sulphonates, fatty alcohols, aluminum stearate, non-ionic polyamide emulsifiers and mixtures thereof is provided in step b., and the loaded mineral carrier obtained in step c. is added in step f. in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-%, based on the total weight of the drilling fluid.

In an exemplary embodiment, the inventive process comprises the steps of
a. providing an alkaline earth metal mineral carrier having an intra-particle intruded specific pore volume of at least 0.8 cm$^3$/g, as measured by mercury intrusion porosimetry, preferably wherein the alkaline earth metal mineral carrier is selected from the group consisting of precipitated hydromagnesite and surface-reacted calcium carbonate,
b. providing at least one surfactant,
c. loading the at least one surfactant onto the mineral carrier to obtain a loaded mineral carrier,
d. preparing a base fluid, preferably being a water-in-oil emulsion comprising an organic fluid and an aqueous fluid, more preferably being an aqueous solution of calcium chloride and an organic fluid,
e. providing a thickening agent, and a weighting agent, combining, in any order, the base fluid, the thickening agent, the loaded mineral carrier, the weighting agent and optionally further additives to obtain a drilling fluid, wherein the drilling fluid comprises:
  a. the alkaline earth metal mineral carrier in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid,
  b. the at least one surfactant in an amount ranging from 0.01 wt.-% to 20 wt.-%, more preferably from 0.05 wt.-% to 15 wt.-%, even more preferably from 0.1 wt.-% to 10 wt.-%, and most preferably from 0.15 wt.-% to 5 wt.-%, based on the total weight of the drilling fluid,
  c. the base fluid in an amount ranging from 15 wt.-% to 95 wt.-%, more preferably from 20 wt.-% to 80 wt.-%, even more preferably from 25 wt.-% to 60 wt.-%, and most preferably from 25 wt.-% to 50 wt.-%, based on the total weight of the drilling fluid,
  d. the thickening agent in an amount ranging from 0.01 wt.-% to 20 wt.-%, preferably from 0.05 wt.-% to 15 wt.-%, more preferably from 0.1 wt.-% to 10 wt.-%, and most preferably from 0.15 wt.-% to 5 wt.-% based on the total weight of the drilling fluid,
  e. the weighting agent in an amount ranging from 5 wt.-% to 95 wt.-%, more preferably from 15 wt.-% to 90 wt.-%, even more preferably from 30 wt.-% to 85 wt.-% and most preferably from 50 wt.-% to 80 wt.-%, based on the total weight of the drilling fluid, and
  f. optionally the further additives in a total amount ranging from 0.001 wt.-% to 50 wt.-%, preferably from 0.01 wt.-% to 40 wt.-%, more preferably from 0.1 wt. % to 30 wt.-% and most preferably from 0.5 wt.-% to 25 wt.-%, based on the total weight of the drilling fluid.

The Inventive Use

A third aspect of the present invention relates to the use of a loaded mineral carrier, comprising an alkaline earth metal mineral carrier and at least one surfactant, for the delivery of a surfactant to a drilling fluid, wherein the mineral carrier has an intra-particle intruded specific pore volume of at least 0.8 cm3/g, as measured by mercury intrusion porosimetry.

It is appreciated that the alkaline earth metal mineral carrier and the at least one surfactant are as described hereinabove.

It may be desirable or required to adjust the composition of the drilling fluid during the drilling process to account for changes in the surrounding formations or an increasing depth of the borehole. Thus, it may be required to add a defined amount of a surfactant in an easy and reliable way, i.e., in the form of a loaded mineral carrier, directly to the drilling fluid within the borehole.

In a preferred embodiment of the present invention, the alkaline earth metal mineral carrier has
  a. an intra-particle intruded specific pore volume in the range from 0.8 to 2.5 $cm^3/g$, preferably from 1.2 to 2.1 $cm^3/g$, and most preferably from 1.5 to 2.0 $cm^3/g$, as measured by mercury intrusion porosimetry, and/or
  b. a BET specific surface area in the range from 10 to 100 $m^2/g$, preferably from 15 to 60 $m^2/g$, and most preferably from 20 to 40 $m^2/g$, measured using nitrogen and the BET method according to ISO 9277:2010, and/or
  c. a ratio of the intra-particle intruded specific pore volume, as measured by mercury intrusion porosimetry, to the BET specific surface area, measured using nitrogen and the BET method according to ISO 9277:2010, of more than 0.01 $cm^3/m^2$, preferably more than 0.05 $cm^3/m^2$, and most preferably more than 0.06 $cm^3/m^2$, such as from 0.06 to 0.25 $cm^3/m^2$, and/or
  d. a $d_{50}$ (vol) in the range from 1 to 1000 µm, preferably from 2 to 75 µm, more preferably from 2.5 to 50 µm, even more preferably from 3 to 20 µm, or from 100 to 1000 µm, preferably from 200 to 800 µm, as determined by laser diffraction.

In another preferred embodiment of the present invention, the alkaline earth metal mineral carrier has a loading capacity in the range from 50 wt.-% to 250 wt.-%, preferably from 60 wt.-% to 220 wt.-%, more preferably from 70 to 200 wt.-%, wherein the loading capacity is defined as the amount of a surfactant, which can be absorbed on the alkaline earth metal mineral carrier, relative to the weight of the dry alkaline earth metal mineral carrier.

Alternatively, the alkaline earth metal mineral carrier has a load capacity in the range from 30 wt.-% to 75 wt.-%, preferably from 40 wt.-% to 70 wt.-%, more preferably from 50 to 65 wt.-%, wherein the load capacity is defined as the amount of a surfactant, which can be absorbed by the alkaline earth metal mineral carrier, relative to the sum of the weight of the dry alkaline earth metal mineral carrier and the surfactant.

In yet another preferred embodiment of the present invention, the alkaline earth metal mineral carrier is selected from the group consisting of alkaline earth metal carbonates, alkaline earth metal phosphates, alkaline earth metal sulphates, alkaline earth metal oxides, alkaline earth metal hydroxides and mixtures thereof, preferably the alkaline earth metal mineral carrier is selected from the group consisting of calcium and/or magnesium carbonates, phosphates, sulphates, oxides, hydroxides and mixtures thereof, more preferably the alkaline earth metal mineral carrier is selected from the group consisting of calcium carbonate, magnesium carbonate and mixtures thereof, and most preferably the alkaline earth metal mineral carrier is selected from the group consisting of precipitated hydromagnesite and surface-reacted calcium carbonate, wherein the surface-reacted calcium carbonate is a reaction product of natural ground or precipitated calcium carbonate with carbon dioxide and one or more H3O+ ion donors in an aqueous medium, wherein the carbon dioxide is formed in situ by the H3O+ ion donor treatment and/or is supplied from an external source and mixtures thereof.

In still another preferred embodiment of the present invention, the surfactant is selected from the group consisting of cationic surfactants, anionic surfactants, nonionic surfactants and mixtures thereof, preferably the surfactant is selected from the group consisting of alkyl ethoxylates, quaternary ammonium salts, ethylene oxide/propylene oxide block copolymers, fatty acids and salts thereof, alkyl aryl sulphonates, fatty alcohols, aluminum stearate, non-ionic polyamide emulsifiers and mixtures thereof, and most preferably the surfactant is selected from the group consisting of C8-C22 alkyl ethoxylates, C6-C12 alkyl phenol alkoxylates, tall oil, tallow oil, salts and derivatives thereof, and mixtures of the foregoing.

It is appreciated that the use of the inventive loaded mineral carrier for the delivery of a surfactant to a drilling fluid minimally affects the physical and rheological properties of the drilling fluid. Thus, it is preferred that the viscosity of a drilling fluid comprising the loaded mineral carrier and a reference drilling fluid differs by no more than 50%, preferably no more than 40%, more preferably by no more than 20%, and most preferably by no more than 10%, wherein the reference drilling fluid refers to the same drilling fluid, wherein the same at least one surfactant has been added without the alkaline earth metal mineral carrier, and wherein the viscosity is given in dial readings as determined by a Fann model 35 viscometer at 50° C.

Furthermore, it is preferred that the gel strength of a drilling fluid comprising the loaded mineral carrier and a reference drilling fluid differs by no more than 40%, preferably by no more than 20% and most preferably by no more than 10%, wherein the gel strength is given in lbs 100 ft-2 as determined by a Fann model 35 viscometer at 50° C.

It is also preferred that the fluid loss of a drilling fluid comprising the loaded mineral carrier and a reference drilling fluid differs by no more than 50%, preferably no more than 40%, more preferably by no more than 20%, and most preferably by no more than 10%, wherein the fluid loss is determined according to the API fluid loss test.

In addition, it is preferred that the drilling fluid exhibits ageing stability, as reflected in that the viscosity and/or gel strength and/or fluid loss of the drilling fluid does not change by more than 20%, preferably more than 15%, more preferably more than 10%, following storage of the drilling mud for 16 h at 77° C.

The following examples are intended to further illustrate the present invention. However, these examples should not be construed as limiting the scope of the present invention in any way.

EXAMPLES

1. Description of Alkaline Earth Metal Mineral Carriers Used

Three alkaline earth metal minerals were assessed as carriers, their properties are listed in Table 1. Materials #C1 and #C2 are inventive, while material #C3 is a comparative example with a non-porous mineral. For material #C3, no intra-particle pore volume could be detected by Hg intrusion porosimetry.

TABLE 1

List and characterization of the carriers.

| Carrier Name | Description | $V_{pore}/$ cm$^3$ g$^{-1}$ | d*/ μm | d**/ μm | $S_{BET}/$ m$^2$ g$^{-1}$ | $d_{50, vol}/$ μm |
|---|---|---|---|---|---|---|
| #C1 | PHM | Precipitated hydromagnesite | 1.711 | 1.3 | 13.4 | 39.5 | 22 |
| #C2 | SRCC | Surface-reacted calcium carbonate | 1.568 | 0.6 | 4.4 | 92 | 5.8 |
| #C3 | GCC | Ground calcium carbonate | 0 | — | — | 7.2 | 1.2 |
| #C4 | PHM | Precipitated hydromagnesite | 1.185 | 0.83 | 36.4 | 55 | 104 |

2. Loading of the Carriers

The loading of the carriers was carried out via manual dosing. 20 g of the carrier was weighed into a beaker and the surfactant was added step-wise. Upon each addition step, the sample was mixed with a spatula, until the morphology of the powder was homogeneous. Once the desired quantity of surfactant was added, a magnetic stirring bar was added to the beaker, and the sample was stirred for at least 30 min, or until it appeared homogeneous.

2.2 Loading of the Carriers Using a Laboratory Mixer

The carrier was dried at 130° C. for 2 h and then added to the mixing vessel of the laboratory mixer MP-GL/Pharma (Somakon Verfahrenstechnik UG, Lunen, Germany) and mixed at 300 rpm. The surfactant was added dropwise at 25-50 g/min depending on the type of surfactant. After the addition of the surfactant the mixing was stopped, and the product was stored in a closed container.

2.3 Loading of Carrier Using an Overhead Stirrer

The carrier was dried at 130° C. for 2 h and then added to a beaker. The carrier was stirred at 900 rpm using an overhead stirrer (IKA RW20 digital, IKA®-Werke GmbH & Co. KG, Staufen, Germany). The surfactant was added dropwise at 5-13 g/min depending on the type of surfactant. After the addition of the surfactant the mixing was stopped, and the product was stored in a closed container.

3. Materials and Methods for the Preparation of the Drilling Muds

The drilling muds were prepared using the ingredients listed in Table 2, following the procedure provided in Table 3. All mixing was carried out using a Polytron PT 10-35 GT with a PT 30/2 EC-F250 homogenizer head. All samples in this report were produced to an approximate volume of 250 mL, using a 600 mL, tall glass beaker to prevent spillage during mixing. After the mud was complete, initial characterization was carried out. After characterization, the sample was transferred to a 260 mL Fann aging cell, the valve stem was attached, and the lid was fastened. After the final mud sample for the day was completed, the aging cells were placed in a Fann 704ET Hot Roller and were aged whilst rolling at 170° F. (76.7° C.) for 14 hours.

TABLE 2

Materials used to prepare the drilling mud

| Material | Supplier |
|---|---|
| n-Paraffin Oil | Hoesch GmbH |
| Nanoclay, surface modified | Sigma Aldrich |
| Linoleic Acid, technical grade | Sigma Aldrich |
| Calcium Chloride, dihydrate | Sigma Aldrich |
| Burnt lime | Omya International AG |
| Aduxol TPA-03 D | Schaerer & Schlaepfer AG |
| API Barite | Steinbock Barite Ltd. |

TABLE 3

Mud preparation instructions

| # | Reagent | Instruction |
|---|---|---|
| 1. | Paraffin oil Linoleic acid | Weigh directly into 600 ml beaker then mix for 5 min at 11'000 rpm |
| 2. | Milk of lime | Remove from mixer, weigh constituent directly into beaker, resume mixing for 5 min at 11'000 rpm |
| 3. | Brine | Weigh constituent in plastic cup, add whilst mixing, continue to mix for 5 min at 11'000 rpm |
| 4. | Nanoclay | Weigh constituent in weighing tray, add whilst mixing, continue to mix for 5 min at 11'000 rpm. |
| 5. | Emulsifier or loaded mineral carrier | Remove from mixer, weigh constituent directly into beaker, resume mixing for 5 min at 11'000 rpm |
| 6. | Barite | Weigh constituent in plastic cup, add whilst mixing, continue mixing for 5 min at 11'000 rpm |

4. Description of the Prepared Drilling Muds

A total of four mud samples were prepared. Mud #M1 is a comparative example with the direct addition of the emulsifier. Muds #M2 and #M3 are inventive examples. Mud #M4 is a comparative sample with ground calcium carbonate. The exact concentration of the solids (in pounds per barrel (ppb) and wt.-%) are summarized in Table 4. The type and loading of the emulsifier is listed in Table 5.

TABLE 4

Composition of drilling muds #M1-M4 (all muds produced at 16 ppg)

| | Paraffin Oil/ | | Linoleic Acid/ | | Milk of lime [a]/ | | Brine [b]/ | | Clay/ | | Emulsifier/ | | Barite/ | |
|---|---|---|---|---|---|---|---|---|---|---|---|---|---|---|
| | ppb | wt. % | ppb | wt. % | ppb | wt. % | ppb | wt. % | ppb | wt. % | ppb | wt. % | ppb | wt. % |
| #M1 | 127 | 19.0 | 2.73 | 0.41 | 1.49 | 0.22 | 68.2 | 10.1 | 8.20 | 1.22 | 0.95 | 0.14 | 463 | 68.9 |
| #M2 | 128 | 19.0 | 2.77 | 0.41 | 1.38 | 0.21 | 68.3 | 10.2 | 8.25 | 1.23 | 2.28 | 0.34 | 461 | 68.6 |
| #M3 | 128 | 19.0 | 2.75 | 0.41 | 1.37 | 0.20 | 68.2 | 10.1 | 8.23 | 1.23 | 1.73 | 0.26 | 462 | 68.8 |
| #M4 | 126 | 18.8 | 2.75 | 0.41 | 1.52 | 0.23 | 67.5 | 10.0 | 8.13 | 1.21 | 18.0 | 2.68 | 448 | 66.7 |

[a] 25 wt.-% solids content.
[b] 25 wt.-% CaCl$_2$.

TABLE 5

Emulsifiers used in the drilling muds #M1-M4

| Material Used | | $m_{Total}$ [a]/ | Fraction emulsifier/ | $m_{eff, Aduxol}$ [b]/ |
|---|---|---|---|---|
| Name | Description | g | — | g ppb |
| #M1 Aduxol TPA-03 D | surfactant | 0.54 | 1.00 | 0.54  0.95 |
| #M2 Aduxol TPA-03 D on #C1 | loaded carrier | 1.30 | 0.44 | 0.58  1.01 |
| #M3 Aduxol TPA-03 D on #C2 | loaded carrier | 0.99 | 0.52 | 0.52  0.91 |
| #M4 Aduxol TPA-03 D on #C3 | loaded carrier | 10.3 | 0.05 | 0.50  0.88 |

[a] Total mass of loaded mineral carrier added.
[b] Actual mass of Aduxol in samples.

5. Materials and Methods for the Characterization of the Drilling Muds

5.1 Density

To determine the effective mud weight/density, a Fann mud balance was used. The sample, shortly after being produced, was filled into the cup of the balance until almost full. The lid was placed on top, such that a small amount of fluid came out of the hole, to ensure the cup was entirely full. The slider weight on the beam was adjusted such that the bubble in the spirit level was centered. The mud weight reading was then read off the beam.

5.2 Rheological Properties

Before assessing the rheological properties of aged samples, they were re-homogenized for 5 min at 6,000 rpm. For the measurement of viscosity, the sample was transferred into a Fann Thermo-Cup, and heated to 50° C., whilst mixing with a Fann model 35 viscometer at 600 rpm. Once the temperature was stable at 50° C. and the dial was stable, the dial reading was noted. The speed was then changed to 300 rpm and the reading was taken once a stable value was reached. This process was repeated for 200 rpm, 100 rpm, 6 rpm and 3 rpm. From the obtained viscosity values at different speeds, the plastic viscosity (PV) and the yield point (YP) was determined. To measure the gel strength, the sample was mixed at 600 rpm for a minimum of 10 seconds. The speed was switched to the lowest speed position and the viscometer switched off. A timer was started and after 10 seconds, the viscometer was switched on to 3 rpm. The highest dial reading reached was noted down as the 10 second gel strength. This process was repeated, but the wait time was increased to 10 minutes. The highest dial reading reached was noted down as the 10 minute gel strength.

5.3 Filtration

As filtration trials were carried out after aging and viscosity characterization at elevated temperatures, muds were first allowed to cool to room temperature before testing. A Fann special hardened filter paper (equivalent to Whatman Grade 50) was placed in the testing vessel for the API filter press, the vessel was assembled, and the sample was poured in. The vessel was placed in the API filter mount, and the lid was placed on top. A 25 mL measuring cylinder was placed underneath the nozzle to collect the filtrate, and the pressure was increased to 100 psig (6.9 bar). The pressure was left constant for 30 min, after which the filtrate volume was measured and noted down as the API Fluid Loss (API filtrate volume).

6. Characterization of the Drilling Muds

TABLE 6

Characterization of the drilling muds #M1-M5.

| | | Viscosity at __ rpm | | | | | | Gel strength | | | | API |
|---|---|---|---|---|---|---|---|---|---|---|---|---|
| | | 600 | 300 | 200 | 100 | 6 | 3 | 10 s | 10 min | PV | YP | Fluid Loss |
| | | Dial reading, θ | | | | | | lbs 100 ft$^{-2}$ | | cP | lbs 100 ft$^{-2}$ | mL |
| #M1 | Un-aged | 61 | 32 | 24 | 16 | 5 | 4 | 6 | 7 | 29 | 3 | |
| | Aged | 67 | 34 | 25 | 17 | 4 | 4 | 5 | 6 | 33 | 1 | 2.2 |
| #M2 | Un-aged | 68 | 38 | 29 | 19 | 6 | 5 | 7 | 8 | 30 | 8 | |
| | Aged | 69 | 38 | 28 | 18 | 5 | 4 | 6 | 7 | 31 | 7 | 4.4 |
| #M3 | Un-aged | 93 | 59 | 48 | 34 | 12 | 10 | 10 | 14 | 34 | 25 | |
| | Aged | 82 | 48 | 37 | 24 | 7 | 6 | 7 | 8 | 34 | 14 | 5 |
| #M4 | Un-aged | 95 | 63 | 51 | 36 | 13 | 11 | 12 | 16 | 32 | 31 | |
| | Aged | 87 | 52 | 39 | 26 | 7 | 6 | 7 | 8 | 35 | 17 | 6.8 |

By comparison of drilling muds #M1 and #M2, it can be gathered that the emulsifier can be dosed as loaded material without impacting the rheology of the fluid, even after aging. In contrast, when utilizing the non-porous carrier in mud #M4, the viscosity is further increased, as is the API fluid loss.

7. Release Trials in Aqueous Media

7.1 Materials and Methods for the Release Trials

Release experiments were conducted with the additives listed in Table 7 with an additive concentration of 5 g L$^{-1}$. Based on the indicated additive loading, the desired amount of solids was dispersed in 100 mL water using a magnetic stirrer (300 rpm) for 1 h at room temperature. Afterwards, the suspensions were filtered using a syringe filter (0.2 μm) and diluted by a factor of 4. Active concentrations were determined using chemical oxygen demand cuvette tests in an Hach Lange DR 6000 spectral photometer. The concentration was calculated based on the average value of 3 measurements. Linearity of the calibration curve was ensured using 3 samples with individual dilution.

TABLE 7

Materials used for the release trials in aqueous media

| # | Type of material | Description |
|---|---|---|
| #A1 | Emulsifier | Nonionic glucamide-based surfactant |
| #A2 | Secondary emulsifier | Fatty acid ester-based secondary emulsifier for water-in-oil emulsions |
| #A3 | Fluid loss additive | 2-Acrylamido-2-methylpropane sulfonic acid-based fluid loss additive for aqueous muds |

7.2 Results of the Release Trials

TABLE 8

Overview of the conducted experiments.

| # Material Used | Loading % | Weigh-in/ g | Release % | Appearance |
|---|---|---|---|---|
| #E1 #A1 loaded on #C4 using protocol 2.3 | 50 | 1.00 | 76.5 | cloudy solution |
| #E2 #A2 loaded on #C4 using protocol 2.3 | 50 | 1.00 | 97.6 | clear solution |
| #E3 #A3 loaded on #C4 using protocol 2.3 | 50 | 1.00 | 97.3 | clear solution |

As can be gathered from Experiments #E1-3, the loaded minerals showed a good release performance reaching >75% in all cases, and even >97% for experiments #E2 and #E3.

The invention claimed is:

1. A drilling fluid comprising
a loaded mineral carrier, wherein the loaded mineral carrier comprises:
  a. An alkaline earth metal mineral carrier having an intra-particle intruded specific pore volume in the range from 0.8 to 2.5 cm$^3$/g, when measured by mercury intrusion porosimetry as a dry alkaline earth metal mineral carrier, and
  b. at least one surfactant absorbed into the pore volume of the dry alkaline earth metal mineral carrier, thereby forming the loaded mineral carrier,
a base fluid,
a thickening agent, and
a weighting agent,
wherein the dry alkaline earth metal mineral carrier is selected from the group consisting of precipitated hydromagnesite (PHM) and surface-reacted calcium carbonate (SRCC), wherein the surface-reacted calcium carbonate is a reaction product of a natural ground or precipitated calcium carbonate with carbon dioxide and one or more H3O+ ion donors in an aqueous medium, wherein the carbon dioxide is formed in situ by the H3O+ ion donor treatment and/or is supplied from an external source and mixtures thereof;
and wherein the dry alkaline earth metal mineral carrier has a loading capacity in the range from 70 to 250 wt.-%, wherein the loading capacity is defined as the amount of a surfactant, which can be absorbed by the dry alkaline earth metal mineral carrier, relative to the weight of the dry alkaline earth metal mineral carrier.

2. The drilling fluid of claim 1, wherein the alkaline earth metal mineral carrier, when measured as the dry alkaline earth metal mineral carrier, has
  a. an intra-particle intruded specific pore volume in the range from 1.5 to 2.0 cm$^3$/g, as measured by mercury intrusion porosimetry, and
  b. a BET specific surface area in the range from 10 to 100 m$^2$/g measured using nitrogen and a BET method according to ISO 9277:2010, and
  c. a ratio of the intra-particle intruded specific pore volume, as measured by mercury intrusion porosimetry, to the BET specific surface area, measured using nitrogen and the BET method according to ISO 9277:2010, in the range of 0.01 to 0.25 cm$^3$/m$^2$, and
  d. a $d_{50}$ (vol) in the range from 1 to 1000 µm as determined by laser diffraction.

3. The drilling fluid of claim 1, wherein the alkaline earth metal mineral carrier further comprises a surface-treatment layer on at least a part of the surface of the alkaline earth metal mineral carrier, wherein the surface-treatment layer is formed by contacting the alkaline earth metal mineral carrier with a surface-treatment composition comprising at least one surface-treatment agent wherein the at least one surface-treatment agent is selected from the group consisting of
  a. at least one mono-substituted succinic anhydride and/or mono-substituted succinic acid and/or a salt thereof, and/or
  b. at least one carboxylic acid and/or a salt thereof, and/or
  c. a phosphoric acid ester blend of one or more phosphoric acid mono-ester and/or salts thereof and/or one or more phosphoric acid di-ester and/or salts thereof, and/or
  d. at least one aldehyde, and/or
  e. abietic acid and/or salts thereof, and/or
  f. at least one polydialkylsiloxane, and/or
  g. at least one trialkoxysilane, and/or
  h. mixtures of materials according to a. to g.

4. The drilling fluid of claim 3, wherein the at least one surface-treatment agent is the at least one mono-substituted succinic anhydride and/or mono-substituted succinic acid and/or salt thereof, and further wherein the at least one mono-substituted succinic anhydride and/or mono-substituted succinic acid and/or a salt thereof comprises a linear, branched, aliphatic or cyclic group having a total amount of carbon atoms from $C_2$ to $C_{30}$ in the substituent, and/or wherein the at least one aliphatic carboxylic acid has a total amount of carbon atoms from $C_{16}$ to $C_{18}$ and/or a salt thereof.

5. The drilling fluid of claim 1, wherein the surfactant is selected from the group consisting of cationic surfactants, anionic surfactants, nonionic surfactants and mixtures thereof.

6. The drilling fluid of claim 1, wherein the base fluid is an aqueous fluid, an organic fluid, an oil-in-water emulsion comprising an aqueous fluid and an organic fluid, or a water-in-oil emulsion comprising an aqueous fluid and an organic fluid,
  wherein the aqueous fluid is selected from the group consisting of water and aqueous salt solutions, and/or
  wherein the organic fluid is selected from the group consisting of mineral oils, synthetic oils, synthetic organics, diesel, paraffin, petroleum, olefins, and mixtures thereof.

7. The drilling fluid of claim 1, wherein the alkaline earth metal mineral carrier has a BET specific surface area in the range from 20 to 40 m$^2$/g, when measured as the dry alkaline earth metal mineral carrier, using nitrogen and a BET method according to ISO 9277:2010.

8. The drilling fluid of claim 1, wherein the alkaline earth metal mineral carrier has a ratio of the intra-particle intruded specific pore volume, as measured by mercury intrusion porosimetry, to a BET specific surface area, when measured as the dry alkaline earth metal mineral carrier using nitrogen and a BET method according to ISO 9277:2010, in the range of 0.06 to 0.25 cm$^3$/m$^2$.

9. The drilling fluid of claim 1, wherein the alkaline earth metal mineral carrier has a d$_{50}$ (vol) in the range from 3 to 20 μm or from 200 to 800 μm as determined by laser diffraction when measured as the dry alkaline earth metal mineral carrier.

10. The drilling fluid of claim 1, wherein the dry alkaline earth metal mineral carrier has a loading capacity in the range from 90 to 180 wt. %.

11. The drilling fluid according to claim 1 wherein the at least one surfactant absorbed into the pore volume of the alkaline earth metal mineral carrier and loaded onto the alkaline earth metal mineral carrier is in an amount from 40 wt.-% to 70 wt.-%, based on the total weight of the loaded mineral carrier.

12. A process for producing the drilling fluid of claim 1, the process comprising the steps of
 a. providing an alkaline earth metal mineral carrier having an intra-particle intruded specific pore volume in the range from 0.8 to 2.5 cm$^3$/g, when measured by mercury intrusion porosimetry as the dry alkaline earth metal mineral carrier, wherein the alkaline earth metal mineral carrier is selected from the group consisting of precipitated-hydromagnesite (PHM) and surface-reacted calcium carbonate (SRCC), wherein the surface-reacted calcium carbonate is a reaction product of natural ground or precipitated calcium carbonate with carbon dioxide and one or more H3O+ ion donors in an aqueous medium, wherein the carbon dioxide is formed in situ by the H3O+ ion donor treatment and/or is supplied from an external source and mixtures thereof;
 b. providing at least one surfactant,
 c. absorbing the at least one surfactant into the pore volume of the alkaline earth metal mineral carrier to obtain a loaded mineral carrier,
 d. preparing a base fluid,
 e. providing a thickening agent, and a weighting agent,
 f. combining, in any order, the base fluid, the thickening agent, the loaded mineral carrier, the weighting agent and optionally further additives to obtain the drilling fluid.

13. The process of claim 12, wherein in step c. the at least one surfactant is loaded onto the alkaline earth metal mineral carrier in an amount of from 70 wt.-% to 250 wt.-% based on the total weight of the dry alkaline earth metal mineral carrier.

14. The process of claim 12, wherein combining step f. comprises the following steps in the following order:
 f1. adding the base fluid,
 f2. adding the thickening agent,
 f3. adding the weighting agent,
 f4. adding the loaded mineral carrier,
 wherein steps f3 and f4 may be performed subsequently or simultaneously.

15. A drilling fluid comprising:
 (i) a loaded mineral carrier, wherein the loaded mineral carrier comprises:
  a. an alkaline earth metal mineral carrier having an intra-particle intruded specific pore volume in a range from 0.8 to 2.5 cm$^3$/g, when measured as a dry alkaline earth metal mineral carrier by mercury intrusion porosimetry, wherein the alkaline earth metal mineral carrier is selected from the group consisting of precipitated hydromagnesite (PHM) and surface-reacted calcium carbonate (SRCC) and has a loading capacity in a range from 70 to 250 wt.-%, wherein the loading capacity is defined as a maximum amount of a surfactant, which can be absorbed by the alkaline earth metal mineral carrier, relative to a weight of the dry alkaline earth metal mineral carrier, and
  b. at least one surfactant absorbed into the pore volume of the alkaline earth metal mineral carrier and loaded onto the alkaline earth metal mineral carrier in an amount from 60 wt.-% to 220 wt.-%, based on the total weight of the dry alkaline earth metal mineral carrier, to form the loaded mineral carrier,
 (ii) a base fluid,
 (iii) a thickening agent, and
 (iv) a weighting agent.

16. The drilling fluid according to claim 15 wherein the at least one surfactant absorbed into the pore volume of the alkaline earth metal mineral carrier and loaded onto the alkaline earth metal mineral carrier is in an amount from 70 wt.-% to 200 wt.-%, based on the total weight of the dry alkaline earth metal mineral carrier.

* * * * *